United States Patent [19]

Kevorkian

[11] Patent Number: 5,446,908
[45] Date of Patent: Aug. 29, 1995

[54] METHOD AND APPARATUS FOR PRE-PROCESSING INPUTS TO PARALLEL ARCHITECTURE COMPUTERS

[75] Inventor: Aram K. Kevorkian, La Jolla, Calif.

[73] Assignee: The United States of America as represented by the Secretary of the Navy, Washington, D.C.

[21] Appl. No.: 964,594

[22] Filed: Oct. 21, 1992

[51] Int. Cl.⁶ ............... G06F 15/347; G06F 15/32
[52] U.S. Cl. .................. 395/800; 395/650; 395/725; 364/194; 364/719; 364/735; 364/736; 364/DIG. 2
[58] Field of Search .............. 395/800, 650, 725; 364/DIG. 2, 752, 755, 807, 578, 736, 194, 719, 735

[56] References Cited

U.S. PATENT DOCUMENTS

| | | | |
|---|---|---|---|
| 4,947,480 | 8/1990 | Lewis | 364/752 |
| 5,136,538 | 8/1992 | Karamakar et al. | 364/754 |
| 5,163,015 | 11/1992 | Yokota | 364/578 |
| 5,185,715 | 2/1993 | Zikan et al. | 364/807 |
| 5,301,342 | 4/1994 | Scott | 395/800 |

Primary Examiner—Alyssa H. Bowler
Assistant Examiner—Dzung C. Nguyen
Attorney, Agent, or Firm—Harvey Fendelman; Thomas Glenn Keough; Eric James Whitesell

[57] ABSTRACT

A pre-processing method and pre-processor decomposed a first problem belonging to a class of linear algebra problems comprising an input sparse symmetric matrix into a suite of sub-problems. The pro-processor generates a suite of signals representing the information content of a permutation of the rows and columns of fire sparse symmetric matrix. These signals are used to define a block-bordered block-diagonal form leading to a Schur-complement resolution wherein each sub-problem corresponds to a perfect parallelism in the first problem. The preprocessor allocates the sub-problems to sub-processors in a network of parallel architecture computers. The sub-processors solve the sub-problems concurrently and combine the results in a front-end computer, which outputs a solution to the first problem.

17 Claims, 47 Drawing Sheets

| ROADMAP (BLOCKS) | HARDWARE MODULES (PROCESSORS) | BLOCKS WITHIN MODULES |
|---|---|---|
| BLOCK 410 | FRONT-END COMPUTER (2280) | |
| BLOCK 415 | FRONT-END COMPUTER (2280) | |
| BLOCK 420 (SEARCH) | SEARCH (2220) | |
| BLOCK 425 | S_TEST (2225) | |
| BLOCK 430 (DFS) | PRE_DFS (2230) PRE_CLASS (2240) CLQS (2250) POST_DFS (2260) | BLOCKS 710-760 BLOCKS 910-990 BLOCK 440 BLOCK 780 |
| BLOCK 435 | INIT (2270) | |
| BLOCK 440 (CLIQUES) | CLQS (2250) | |
| BLOCK 445 | FRONT-END COMPUTER (2280) | |
| BLOCK 770 (CLASSIFY) | PRE_CLASS (2240) CLQS (2250) | BLOCKS 910-990 BLOCK 440 |

$ADJ(V_1) = (V_5, V_7, V_8, V_{16}, V_{17})$ $ADJ(V_2) = (V_{13}, V_{17})$ $ADJ(V_3) = (V_4, V_{14}, V_{20})$ $ADJ(V_4) = (V_3, V_{13}, V_{20})$ $ADJ(V_5) = (V_1, V_6, V_7, V_8, V_{14}, V_{16}, V_{17}, V_{18}, V_{19})$ $ADJ(V_6) = (V_5, V_{14}, V_{18}, V_{19})$ $ADJ(V_7) = (V_1, V_5, V_8, V_{16}, V_{17})$ $ADJ(V_8) = (V_1, V_5, V_7, V_{11}, V_{12}, V_{13}, V_{16}, V_{17}, V_{21})$ $ADJ(V_9) = (V_{10}, V_{15}, V_{20})$ $ADJ(V_{10}) = (V_9, V_{14}, V_{15})$ $ADJ(V_{11}) = (V_8, V_{12}, V_{13}, V_{21})$ $ADJ(V_{12}) = (V_8, V_{11}, V_{17}, V_{21})$ $ADJ(V_{13}) = (V_2, V_4, V_8, V_{11}, V_{15}, V_{21})$ $ADJ(V_{14}) = (V_3, V_5, V_6, V_{10}, V_{18}, V_{19}, V_{21})$ $ADJ(V_{15}) = (V_9, V_{10}, V_{13})$ $ADJ(V_{16}) = (V_1, V_5, V_7, V_8, V_{17})$ $ADJ(V_{17}) = (V_1, V_2, V_5, V_7, V_8, V_{12}, V_{16})$ $ADJ(V_{18}) = (V_5, V_6, V_{14}, V_{19})$ $ADJ(V_{19}) = (V_5, V_6, V_{14}, V_{18})$ $ADJ(V_{20}) = (V_3, V_4, V_9)$ $ADJ(V_{21}) = (V_8, V_{11}, V_{12}, V_{13})$

FIG. 3

```
% procedure roadmap
%
%***********************************************************************
%   Given an undirected graph G = (V, E), this program computes in linear-time a    *
%   vertex partition Π* = (V₁, V₂, ..., Vᵣ, S*) with the following three properties:  *
%       o every element Vᵢ of the partition induces a clique,                        *
%       o for any two distinct elements Vᵢ and Vⱼ of the partition, no vertex in Vᵢ is *
%         adjacent to a vertex in Vⱼ,                                                *
%       o interior of every clique in G is an element of the partition.              *
%***********************************************************************
%
global IADJ LADJ LEAF NGU QUEUE RANKE SN TEST VC
sparsedata                          % user provided input (n, IADJ and LADJ)
QUEUE = [];                         % store connected components of G(V-S)
IQUEUE = [];                        % pointers to "roots" and "end" of QUEUE
TYPE = [];                          % classify "type" of connected component
LEAF = 0;                           % pointer to last vertex placed on QUEUE
VC = zeros(1,n);                    % mark all vertices "new"
SN = zeros(1,n);                    % initialize separator numbers to zero
TEST = zeros(1,n);                  % initialize Boolean array TEST to zero
search                              % compute S = {v | SN(v) = 1}
inf any(SN == 1)                    % if S is nonempty then
    dfs                             %     compute connected components
esle                                % else
    ROOT = 1;                       %     pointer to root vertex of V
    LEAF = n;                       %     pointer to end vertex of V
    QUEUE = [ROOT:LEAF];            %     place entire vertex set V on QUEUE
    IQUEUE = [ROOT];                %     pointer to root vertex on QUEUE
    TYPE = [0];                     %     G is a regular graph (also not a clique)
    cliques                         %     compute independent cliques of G
end                                 % end
IQUEUE = [IQUEUE, LEAF+1];          % pointer to end of QUEUE
```

FIG. 14

```
% procedure roadmap
%
%*********************************************************************
%   This procedure performs the following tasks:                     *
%       o queries the user for size of matrix (n);                   *
%       o requires from the user the adjacency structure pair (IADJ, LADJ); *
%       o tests correctness of input data;                           *
%       o computes the single array DEG (degrees of vertices).       *
%*********************************************************************
%
% query the user for size of matrix (n)
    n = input ('Enter n (if n < = 1, program quits):');
    if n < = 1, break, end
    end
% provide adjacency structure pair (IADJ, LADJ)
    if n == 21
        IADJ = [1 6 8 11 14 23 27 32 41 44 47 51 55 61 67 70 75 82 86 90 93 97];
        LADJ = [5 7 8 16 17 13 17 4 14 20 3 13 20 1 6 7 8 14 16 17 18 19];
        LADJ = [LADJ, 5 14 18 19 1 5 8 16 17 1 5 7 11 12 13 16 17 21 10 15 20];
        LADJ = [LADJ, 9 14 15 8 12 13 21 8 11 17 21 2 4 8 11 15 21];
        LADJ = [LADJ, 3 5 6 10 18 19 9 10 13 1 5 7 8 17];
        LADJ = [LADJ, 1 2 5 7 8 12 16 5 6 14 19 5 6 14 18 3 4 9 8 11 12 13];
    end
% test correctness of input data
    RANKI = length(IADJ);
    RANKL = length(LADJ);
    if RANKI ~= n+1
        disp('IADJ does not have correct length. Check data.');
        break, end
    end
    if RANKL ~= IADJ(RANKI)-1
        disp('LADJ does not have correct length. Check data.');
        break, end
    end
```

```
if any(LADJ > n)
    disp('LADJ contains a column index > n.  Check data.');
    break, end
    disp('IADJ does not have correct length.  Check data.');
    break, end
end
if RANKL == n*(n-1)
    disp('Off-diagonal part of M is full and so G is a clique.');
    break, end
end
% compute degrees of vertices
    DEG = IADJ(2:n+1)-IADJ(1:n);
```

FIG. 15B

```
% procedure search
%
%*************************************************************************
%   This procedure computes in G a set of vertices S defined by            *
%       S = { v   there exists in E an edge (v,w) with DEG(v) > DEG(w)}    *
%   The set S has the property that every interior clique in G is a connected *
%   component of the induced subgraph G(V-S).                              *
%*************************************************************************
%
for v = 1:n-1                              % for each vertex v in V-{n} do
    VC(v) = 1;                             %     mark vertex v "old"
    for w = LADJ(IADJ(v):IADJ(v+1))-1      %     for all w adjacent to v do
        if VC(w) == 0                      %         if w is marked "new" then
            if DEG(v) ~= DEG(w)            %             if DEG(v) ≠ DEG(w) then
                if DEG(v) < DEG(w)         %                 if DEG(v) < DEG(w) then
                    SN(w) = 1;             %                     w is in S
                else                       %                 else
                    SN(v) = 1;             %                     v is in S
                end                        %                 end
            end                            %             end
        end                                %         end
    end                                    %     end
end                                        % end
VC = zeros(1,n);                           % mark all vertices "new"
```

FIG. 16

```
% procedure dfs
%
%*********************************************************************
%    This procedure computes each connected component G(U) of subgraph G(V-S)      *
%*********************************************************************
%
for v = 1:n                              % for all v in V do
    if SN(v) == 0                        %    if v is in V-S then
        if VC(v) == 0                    %       if v is marked "new" then
            VC(v) = 1;                   %          mark v (root vertex) "old"
            QUEUE = [QUEUE, v];          %          add root vertex to QUEUE
            LEAF = LEAF+1;               %          pointer to end vertex
            ROOT = LEAF;                 %          pointer to root vertex
            IQUEUE = [IQUEUE, ROOT];     %          add root pointer to IQUEUE
            RANKE = 0;                   %          count edges visited in dfs
            NGU = [];                    %          neighborhood of U in G
            component(v)                 %          compute G(U)
            RANKN = length (NGU);        %          compute size of NGU
            RANKU = LEAF-ROOT+1;         %          compute size of U
            TEST(NGU) = zeros(1,RANKN);  %          update Boolean array TEST
            classify                     %          identify "type" of component
        end                              %       end
    end                                  %    end
end                                      % end
```

FIG. 17

```
% function component(v)
%
%*********************************************************************
%    This function computes connected component G(U) and neighborhood of U    *
%*********************************************************************
function component(v)                    % declare component(v) as function file
for w = LADJ(IADJ(v):IADJ(v+1)-1)        % for all w adjacent to v do
    if SN(w) == 0                        %    if w is in V-S do
        RANKE = RANKE+1;                 %       account for visited edge (v,w)
        if VC(w) == 0                    %       if w is marked "new" then
            VC(w) = 1;                   %          mark w "old"
            QUEUE = [QUEUE, w];          %          add w to QUEUE
            LEAF = LEAF+1;               %          update pointer to end vertex
            component(w)                 %          call component(w)
        end                              %       end
    else                                 %    else
        if TEST(w) == 0                  %       if w is not on NGU then
            NGU = [NGU, w];              %          add w to NGU
            TEST(w) = 1;                 %          mark w as vertex on NGU
        end                              %       end
    end                                  %    end
end                                      % end
```

FIG. 18

```
% procedure classify
%
%*****************************************************************************
%    This procedure ranks the components of G(V-S) into cliques and noncliques.    *
%    Subsequently Corollaries 4.2 and 4.3 are applied to each clique component.    *
%*****************************************************************************
%
if RANKE == RANKU*(RANKU-1)              % of G(U) is a clique then
    if RANKN == 1                        %    if Cor. 4.2 holds then
        TYPE = [TYPE, 1];                %        G(U) is an interior clique
    else                                 %    else
        R = RANKN+RANKU-1;               %        compute integer R
        if any(DEG(QUEUE(ROOT:LEAF))~=R) %        if Cor. 4.3 does not hold
            TYPE = [TYPE, 3];            %            G(U) is not an si clique
        else                             %        else
            TYPE = [TYPE, -2];           %            G(U) is an si clique
        end                              %        end
    end                                  %    end
else                                     % else
    TYPE = [TYPE, 0];                    %    G(U) is not a clique
    VC(QUEUE(ROOT:LEAF))=zeros(1,RANKU); %    mark all vertices in U "new"
    cliques                              %    compute independent cliques
end                                      % end
```

FIG. 19

```
% procedure cliques
%
%******************************************************************************
%    This procedure computes independent cliques G(U1), G(U2), ... , and their       *
%    neighborhoods N(U1), N(U2), ... , such that                                     *
%         G(U1) is maximal in G(U),                                                  *
%         G(U2) is maximal in G(U - U1 - N(U1)),                                     *
%         G(U3) is maximal in G(U - U1 - U2 - N(U1) - N(U2)),                        *
%    and so forth.                                                                   *
%******************************************************************************
%
CLQS = [];                              % stores independent cliques (indclqs)
NBRS = [];                              % stores neighborhoods (nbrhd) of indclqs
CLQROOT = ROOT;                         % pointers to indclqs on array CLQS
TAIL = 0;                               % pointer to last vertex on array CLQS
for v = QUEUE(ROOT:LEAF)                % for each vertex v in U do
    if VC(v) == 0                       %    if v is marked "new" then
        VC(v) = 1;                      %       mark v "old"
        ADJCNT = [];                    %       adj(v) in G(U-CLQS-NBRS)
        maxclq                          %       compute maximal clique
    end                                 %    end
end                                     % end
QUEUE(ROOT:LEAF) = [CLQS, NBRS];        % reorder vertices in U on array QUEUE
```

FIG. 20

```
% procedure maxclq
%
%***********************************************************************
%   This procedure computes in induced subgraph G(U-CLQS-NBRS) a maximal    *
%   clique with starting vertex (root) v.                                   *
%***********************************************************************
%
for w = LADJ(IADJ(v):IADJ(v+1)-1)            % for all w adjacent to v do
    if SN(w) == 0                            %   if w is in U and not on NBRS then
        if VC(w) == 0                        %     if w is marked "new" then
            ADJCNT = [ADJCNT, w];            %       add w to ADJCNT
        else                                 %     else
            NBRS = [NBRS, v];                %       reject v as starting vertex
            SN(v) = 1;                       %       avoid duplicate of v
            return                           %       return to cliques
        end                                  %     end
    end                                      %   end
end                                          % end
CLQS = [CLQS, v];                            % C = {v}
TEST(v) = 1;                                 % C = {x ∈ V | TEST(x) = 1}
RANKC = 1;                                   % RANKC = |C|
for u = ADJCNT                               % for each vertex u on ADJCNT do
    COUNT = 0;                               %   COUNT = |C ∩ ADJ(u)|
    VC(u) = 1;                               %   mark u "old"
    for w = LADJ(IADJ(u):IADJ(u+1)-1)        %   for all w adjacent to u do
        if TEST(w) == 1                      %     if TEST(w) = 1 then
            COUNT = COUNT+1;                 %       w is in C
        end                                  %     end
    end                                      %   end
    if COUNT == RANKC                        %   if u is adjacent to all w in C then
        CLQS = [CLQS, u];                    %     add u to C
        TEST(u) = 1;                         %     C = {x ∈ V | TEST(x) = 1}
        RANKC = RANKC+1;                     %     RANKC = |C|
    else                                     %   else
```

| FIG. 21A |
| FIG. 21B |

```
if COUNT == RANKC                        %   if u is adjacent to all w in C then
    NBRS = [NBRS, u];                    %       add u to C
    TEST(u) = 1;                         %       C = {x ∈ V | TEST(x) = 1}
    RANKC = RANKC+1;                     %       RANKC = |C|
else                                     %   else
    NBRS = [NBRS, u];                    %       u is in neighborhood of C
    SN(u) = 1;                           %       avoid duplicates of u on NBRS
    end                                  %   end
end
HEAD = TAIL+1;                           % pointer to starting vertex of C on CLQS
TAIL = TAIL+RANKC;                       % pointer to last vertex of C on CLQS
TEST(CLQS(HEAD:TAIL))=zeros(1,RANKC);    % reset TEST to zero
CLQROOT = CLQROOT+RANKC;                 % pointer to next starting vertex
IQUEUE = [IQUEUE, -CLQROOT];             % add pointer (negated) to IQUEUE
```

FIG. 21B

CLIQUES OF TYPE $C_1$ THROUGH $C_4$

| VERTEX V | VERTEX DEGREE DEG | VERTEX COLOR VC | SEPARATOR NUMBER SN |
|---|---|---|---|
| 1 | 2 | 0 | 0 |
| 3 | 3 | 0 | 0 |
| 4 | 5 | 0 | 0 |
| 2 | 3 | 0 | 0 |
| 5 | 9 | 0 | 0 |
| 6 | 4 | 0 | 0 |
| 7 | 5 | 0 | 0 |
| 8 | 9 | 0 | 0 |
| 9 | 3 | 0 | 0 |
| 10 | 3 | 0 | 0 |
| 11 | 4 | 0 | 0 |
| 12 | 4 | 0 | 0 |
| 13 | 6 | 0 | 0 |
| 14 | 6 | 0 | 0 |
| 15 | 3 | 0 | 0 |
| 16 | 5 | 0 | 0 |
| 17 | 7 | 0 | 0 |
| 18 | 4 | 0 | 0 |
| 19 | 4 | 0 | 0 |
| 20 | 3 | 0 | 0 |
| 21 | 4 | 0 | 0 |

FIG. 36

| VERTEX | 1 | | 2 | | 3 | | 4 | | 5 | | 6 | | 7 | | 8 | | 9 | | 10 | |
|---|---|---|---|---|---|---|---|---|---|---|---|---|---|---|---|---|---|---|---|---|
| | VC | SN | VC | SN | VC | SN | VC | SN | VC | SN | VC | SN | VC | SN | VC | SN | VC | SN | VC | SN |
| 1 | 1 | 0 | 1 | 0 | 1 | 0 | 1 | 0 | 1 | 0 | 1 | 0 | 1 | 0 | 1 | 0 | 1 | 0 | 1 | 0 |
| 2 | 0 | 0 | 1 | 0 | 1 | 0 | 1 | 0 | 1 | 0 | 1 | 0 | 1 | 0 | 1 | 0 | 1 | 0 | 1 | 0 |
| 3 | 0 | 0 | 0 | 0 | 1 | 0 | 1 | 0 | 1 | 0 | 1 | 0 | 1 | 0 | 1 | 0 | 1 | 0 | 1 | 0 |
| 4 | 0 | 0 | 0 | 0 | 0 | 0 | 1 | 0 | 1 | 0 | 1 | 0 | 1 | 0 | 1 | 0 | 1 | 0 | 1 | 0 |
| 5 | 0 | 1 | 0 | 1 | 0 | 1 | 0 | 1 | 1 | 1 | 1 | 1 | 1 | 1 | 1 | 1 | 1 | 1 | 1 | 1 |
| 6 | 0 | 0 | 0 | 0 | 0 | 0 | 0 | 0 | 0 | 0 | 1 | 0 | 1 | 0 | 1 | 0 | 1 | 0 | 1 | 0 |
| 7 | 0 | 0 | 0 | 0 | 0 | 0 | 0 | 0 | 0 | 0 | 0 | 0 | 1 | 0 | 1 | 0 | 1 | 0 | 1 | 0 |
| 8 | 0 | 1 | 0 | 1 | 0 | 1 | 0 | 1 | 0 | 1 | 0 | 1 | 0 | 1 | 1 | 1 | 1 | 1 | 1 | 1 |
| 9 | 0 | 0 | 0 | 0 | 0 | 0 | 0 | 0 | 0 | 0 | 0 | 0 | 0 | 0 | 0 | 0 | 1 | 0 | 1 | 0 |
| 10 | 0 | 0 | 0 | 0 | 0 | 0 | 0 | 0 | 0 | 0 | 0 | 0 | 0 | 0 | 0 | 0 | 0 | 0 | 1 | 0 |
| 11 | 0 | 0 | 0 | 0 | 0 | 0 | 0 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 | 0 | 0 | 0 | 0 | 0 | 0 | 0 |
| 13 | 0 | 0 | 0 | 1 | 0 | 1 | 0 | 1 | 0 | 1 | 0 | 1 | 0 | 1 | 0 | 1 | 0 | 1 | 0 | 1 |
| 14 | 0 | 0 | 0 | 0 | 0 | 1 | 0 | 1 | 0 | 1 | 0 | 1 | 0 | 1 | 0 | 1 | 0 | 1 | 0 | 1 |
| 15 | 0 | 0 | 0 | 0 | 0 | 0 | 0 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 | 0 | 0 | 0 | 0 | 0 | 0 | 0 |
| 17 | 0 | 1 | 0 | 1 | 0 | 1 | 0 | 1 | 0 | 1 | 0 | 1 | 0 | 1 | 0 | 1 | 0 | 1 | 0 | 1 |
| 18 | 0 | 0 | 0 | 0 | 0 | 0 | 0 | 0 | 0 | 0 | 0 | 0 | 0 | 0 | 0 | 0 | 0 | 0 | 0 | 0 |
| 19 | 0 | 0 | 0 | 0 | 0 | 0 | 0 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 | 0 | 0 | 0 | 0 | 0 | 0 | 0 |
| 21 | 0 | 0 | 0 | 0 | 0 | 0 | 0 | 0 | 0 | 0 | 0 | 0 | 0 | 0 | 0 | 0 | 0 | 0 | 0 | 0 |

| 11 | | 12 | | 13 | | 14 | | 15 | | 16 | | 17 | | 18 | | 19 | | 20 | |
|---|---|---|---|---|---|---|---|---|---|---|---|---|---|---|---|---|---|---|---|
| VC | SN | VC | SN | VC | SN | VC | SN | VC | SN | VC | SN | VC | SN | VC | SN | VC | SN | VC | SN |
| 1 | 0 | 1 | 0 | 1 | 0 | 1 | 0 | 1 | 0 | 1 | 0 | 1 | 0 | 1 | 0 | 1 | 0 | 1 | 0 |
| 1 | 0 | 1 | 0 | 1 | 0 | 1 | 0 | 1 | 0 | 1 | 0 | 1 | 0 | 1 | 0 | 1 | 0 | 1 | 0 |
| 1 | 0 | 1 | 0 | 1 | 0 | 1 | 0 | 1 | 0 | 1 | 0 | 1 | 0 | 1 | 0 | 1 | 0 | 1 | 0 |
| 1 | 0 | 1 | 0 | 1 | 0 | 1 | 0 | 1 | 0 | 1 | 0 | 1 | 0 | 1 | 0 | 1 | 0 | 1 | 0 |
| 1 | 1 | 1 | 1 | 1 | 1 | 1 | 1 | 1 | 1 | 1 | 1 | 1 | 1 | 1 | 1 | 1 | 1 | 1 | 1 |
| 1 | 0 | 1 | 0 | 1 | 0 | 1 | 0 | 1 | 0 | 1 | 0 | 1 | 0 | 1 | 0 | 1 | 0 | 1 | 0 |
| 1 | 0 | 1 | 0 | 1 | 0 | 1 | 0 | 1 | 0 | 1 | 0 | 1 | 0 | 1 | 0 | 1 | 0 | 1 | 0 |
| 1 | 1 | 1 | 1 | 1 | 1 | 1 | 1 | 1 | 1 | 1 | 1 | 1 | 1 | 1 | 1 | 1 | 1 | 1 | 1 |
| 1 | 0 | 1 | 0 | 1 | 0 | 1 | 0 | 1 | 0 | 1 | 0 | 1 | 0 | 1 | 0 | 1 | 0 | 1 | 0 |
| 1 | 0 | 1 | 0 | 1 | 0 | 1 | 0 | 1 | 0 | 1 | 0 | 1 | 0 | 1 | 0 | 1 | 0 | 1 | 0 |
| 1 | 0 | 1 | 0 | 1 | 0 | 1 | 0 | 1 | 0 | 1 | 0 | 1 | 0 | 1 | 0 | 1 | 0 | 1 | 0 |
| 0 | 0 | 1 | 0 | 1 | 0 | 1 | 0 | 1 | 0 | 1 | 0 | 1 | 0 | 1 | 0 | 1 | 0 | 1 | 0 |
| 0 | 1 | 0 | 1 | 1 | 1 | 1 | 1 | 1 | 1 | 1 | 1 | 1 | 1 | 1 | 1 | 1 | 1 | 1 | 1 |
| 0 | 1 | 0 | 1 | 0 | 1 | 1 | 1 | 1 | 1 | 1 | 1 | 1 | 1 | 1 | 1 | 1 | 1 | 1 | 1 |
| 0 | 0 | 0 | 0 | 0 | 0 | 0 | 0 | 1 | 0 | 1 | 0 | 1 | 0 | 1 | 0 | 1 | 0 | 1 | 0 |
| 0 | 0 | 0 | 0 | 0 | 0 | 0 | 0 | 0 | 0 | 1 | 0 | 1 | 0 | 1 | 0 | 1 | 0 | 1 | 0 |
| 0 | 1 | 0 | 1 | 0 | 1 | 0 | 1 | 0 | 1 | 0 | 1 | 1 | 1 | 1 | 1 | 1 | 1 | 1 | 1 |
| 0 | 0 | 0 | 0 | 0 | 0 | 0 | 0 | 0 | 0 | 0 | 0 | 0 | 0 | 1 | 0 | 1 | 0 | 1 | 0 |
| 0 | 0 | 0 | 0 | 0 | 0 | 0 | 0 | 0 | 0 | 0 | 0 | 0 | 0 | 0 | 0 | 1 | 0 | 1 | 0 |
| 0 | 0 | 0 | 0 | 0 | 0 | 0 | 0 | 0 | 0 | 0 | 0 | 0 | 0 | 0 | 0 | 0 | 0 | 1 | 0 |
| 0 | 0 | 0 | 0 | 0 | 0 | 0 | 0 | 0 | 0 | 0 | 0 | 0 | 0 | 0 | 0 | 0 | 0 | 0 | 0 |

FIG. 37B

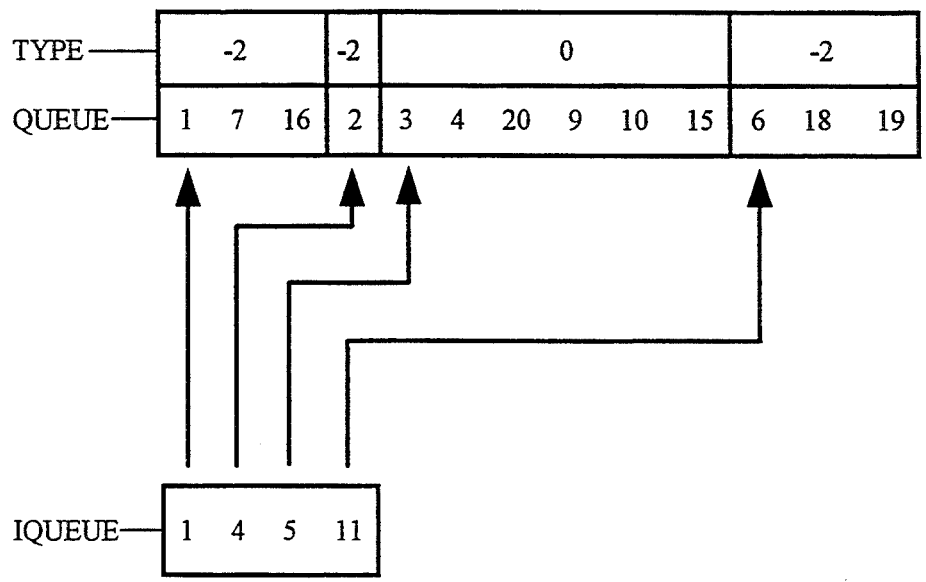
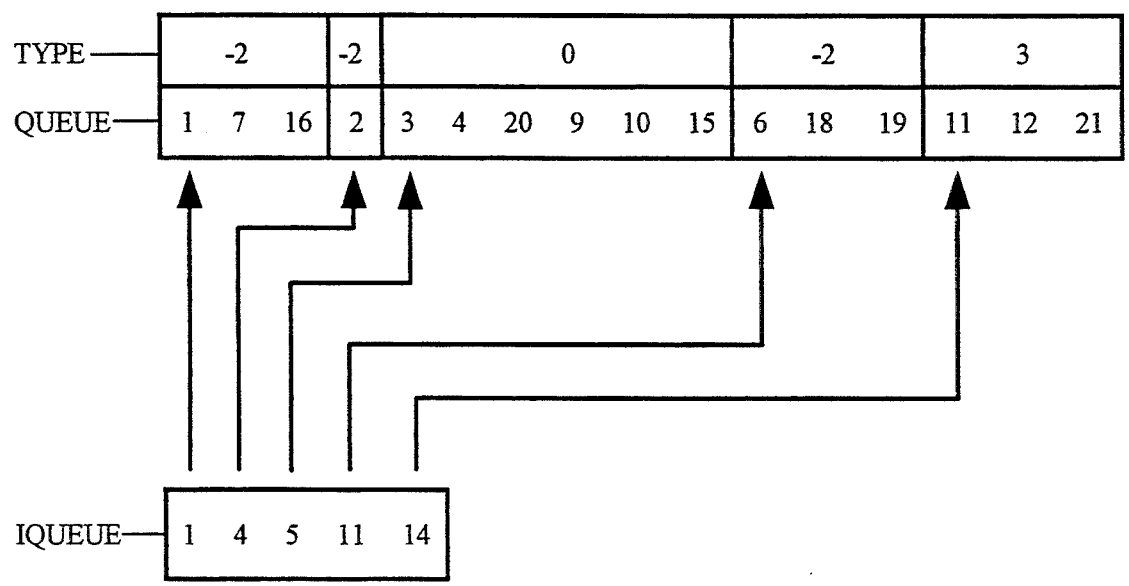
FIG. 39

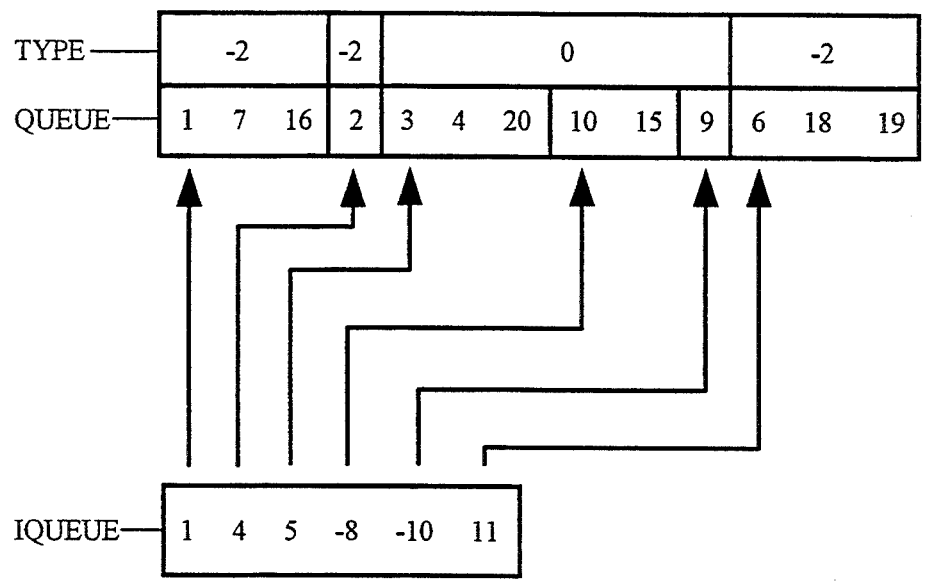
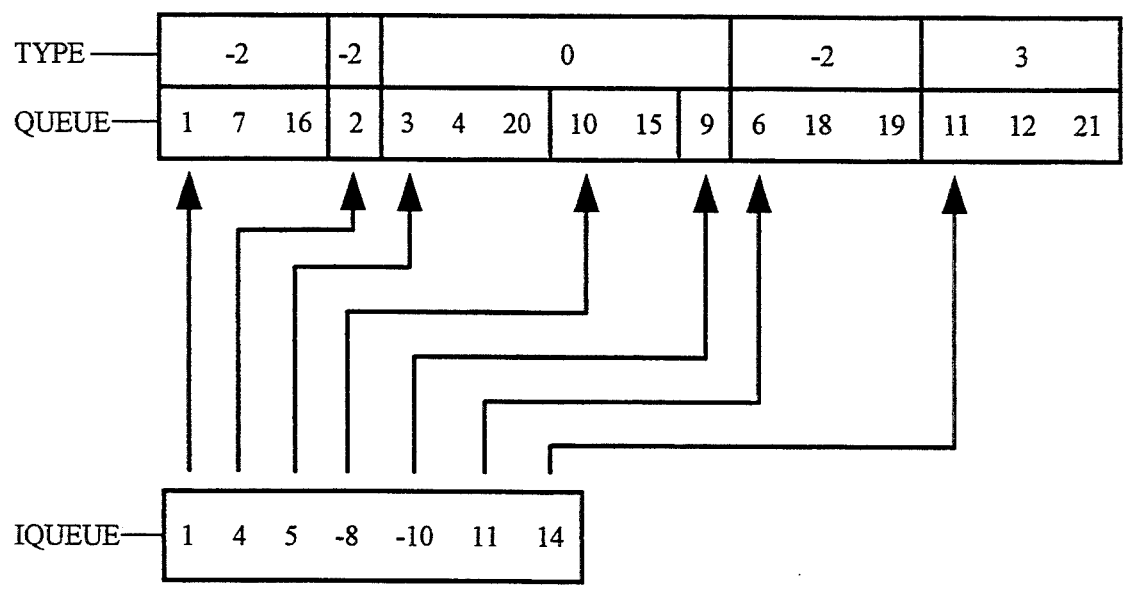
FIG. 41

| ROADMAP (BLOCKS) | HARDWARE MODULES (PROCESSORS) | BLOCKS WITHIN MODULES |
|---|---|---|
| BLOCK 410 | FRONT-END COMPUTER (2280) | |
| BLOCK 415 | FRONT-END COMPUTER (2280) | |
| BLOCK 420 (SEARCH) | SEARCH (2220) | |
| BLOCK 425 | S_TEST (2225) | |
| BLOCK 430 (DFS) | PRE_DFS (2230)<br>PRE_CLASS (2240)<br>CLQS (2250)<br>POST_DFS (2260) | BLOCKS 710-760<br>BLOCKS 910-990<br>BLOCK 440<br>BLOCK 780 |
| BLOCK 435 | INIT (2270) | |
| BLOCK 440 (CLIQUES) | CLQS (2250) | |
| BLOCK 445 | FRONT-END COMPUTER (2280) | |
| BLOCK 770 (CLASSIFY) | PRE_CLASS (2240)<br>CLQS (2250) | BLOCKS 910-990<br>BLOCK 440 |

FIG. 42

| SOFTWARE CONNECTIONS | HARDWARE CONNECTIONS |
| --- | --- |
| BLOCK 410 TO 415 | WITHIN MODULE 2280 |
| BLOCK 415 TO 420 | MODULE 2280 TO 2220 |
| BLOCK 420 TO 425 | MODULE 2220 TO 2225 |
| BLOCK 425 TO 430 | MODULE 2225 TO 2230 |
| BLOCK 430 TO 445 | MODULE 2260 TO 2280 |
| BLOCK 425 TO 435 | MODULE 2225 TO 2270 |
| BLOCK 435 TO 440 | MODULE 2270 TO 2250 |
| BLOCK 440 TO 445 | MODULE 2250 TO 2280 |
| BLOCK 760 TO 770 | MODULE 2230 TO 2240 |
| BLOCK 990 TO 440 | MODULE 2240 TO 2250 |
| BLOCK 770 TO 780 | MODULE 2250 TO 2260 |

FIG. 44

METHOD AND APPARATUS FOR PRE-PROCESSING INPUTS TO PARALLEL ARCHITECTURE COMPUTERS

STATEMENT OF GOVERNMENT INTEREST

The invention described herein may be manufactured and used by or for the Government of the United States for governmental purposes without the payment of any royalties thereon or therefor.

FIELD OF THE INVENTION

The present invention relates to the field of multiprocessor parallel-architecture high-performance computers and to the enhancement of the effectiveness and utility of such computers by a method and apparatus for pre-processing the data input to such a computer in a manner which enables arbitrary problems of a common category (sparse symmetric linear systems of equations) to be solved by such computers with reduced storage requirements and in reduced execution time.

Although the present invention includes an algorithm it operates to alter its environment in real time by decomposing any presented problem into a suite of smaller tasks and placing each such task into a different processor for parallel execution.

BACKGROUND OF THE INVENTION

Many critically important and computationally demanding problems of interest to both government and industry require the solution of linear systems of equations whose coefficient matrix is both sparse and symmetric. There are available sophisticated numerical analysis techniques for enhancing the computational effectiveness of solution of such problems on single processor machines, but they fail to fully exploit the hidden parallelisms in such problems and in general have reached the limits of what can be accomplished in such an architecture.

Likewise there are available commercially a variety of powerful new multi-processor parallel-architecture computers, but there have been no general purpose tools for adapting an arbitrary problem to the full capabilities of such machines even in the ubiquitous case of basic linear algebra problems of the type described.

Thus, a need exists for a tool which can be used as a pre-processor in every kind of parallel-architecture computer and, without time-consuming individualized human preparation or interactive intervention, efficiently decompose any presented problem into an equivalent collection of smaller tasks which can be executed independently on different processors, thereby reducing both execution time and storage requirements.

Accordingly, it is an object of this invention to provide a method and apparatus for pre-processing the input data of any problem regarding solution of sparse symmetric linear systems of equations in such a manner as to decompose the problem into independently solvable smaller tasks which can be executed in parallel on the processors of an arbitrary parallel-architecture computer, and for allocation of these tasks to the different processors, and for operation of the processors in parallel during the execution of these tasks.

Another object of the present invention is to achieve such decomposition, allocation and operation in a manner which maximally exploits the sparsity structure (including the hidden parallelisms in such problems) to reduce storage requirements and execution time.

CONCISE SUMMARY OF THE INVENTION

Given any linear system of equations $Mx = b$ in which M is a large sparse symmetric matrix, the invention in this patent application provides a fully automated system for generating computational tasks which can then be processed independently of each other by the different processors within a parallel-architecture high-performance computer. Such an automatic decomposition, allocation and operation tool is essential for the effective applications of parallel architecture machines.

A key preliminary step in the pre-processor of the present invention has been the representation of the sparsity structure (and therefore the hidden parallelism structure) of arbitrary block symmetric matrices as a combinatorial graph-theoretic object.

The next step is the recognition that certain subgraphs called independent cliques correspond uniquely to the regions of parallel computation; that is, such cliques spawn computational tasks that can be executed in parallel. Finally, a special kind of cliques called herein interior cliques have the property that any graph obtained by the elimination of its interior cliques is as sparse as the original problem. Therefore the identification and further categorization and classification of cliques forms a part of any effective re-ordering strategy for the solutions of systems of equations.

The heart of the present invention is a special pre-processor which we call a "search" pre-processor. Except in certain rare problems almost never encountered in practical work, this search pre-processor partitions the rows and columns of the matrix M into mutually exclusive subsets which include all interior cliques together with other cliques which may not be interior but which serve to preserve the original sparsity as much as practical.

The permutations of rows and columns of M defined by this partitioning reduce the original problem to a block-bordered block-diagonal form which can be factored in parallel operations that result in a lower-dimensional Schur complement resolution of the original problem.

DESCRIPTION OF THE DRAWINGS

FIG. 3 presents the adjacency lists of the vertices in the graph G;

FIG. 14 presents program roadmap in the MATLAB language;

FIG. 15 presents sub-program sparsedata in the MATLAB language;

FIG. 16 presents sub-program search in the MATLAB language;

FIG. 17 presents sub-program dfs in the MATLAB language;

FIG. 18 presents sub-program component in the MATLAB language;

FIG. 19 presents sub-program classify in the MATLAB language;

FIG. 20 presents sub-program cliques in the MATLAB language;

FIG. 21 presents sub-program maxclq in the MATLAB language;

Figure 32:
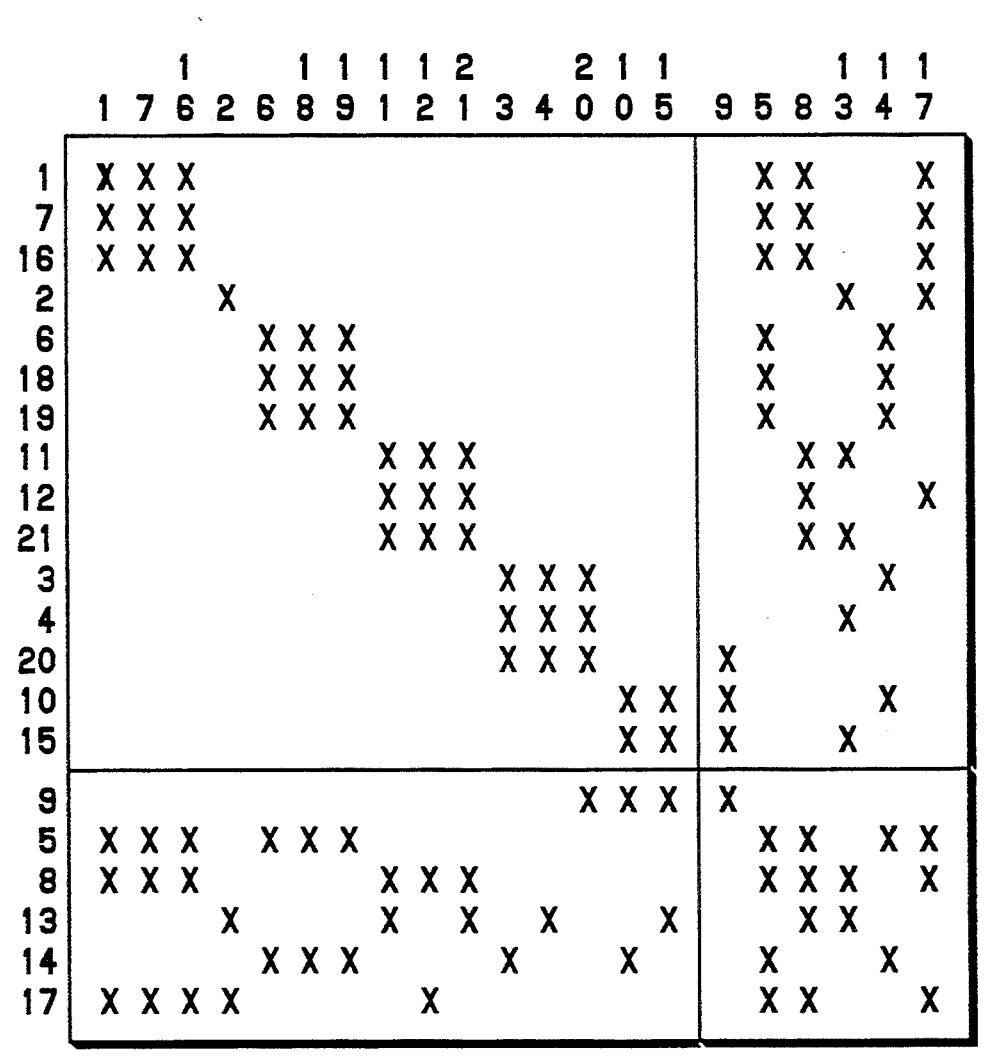

FIG. 32 depicts the block bordered diagonal matrix $PMP^T$ for the example of FIG. 1.

FIG. 34 depicts the fill elements in a block bordered diagonal form of M with a leading 4×4 block diagonal matrix A.

FIG. 35 depicts the fill elements in a block bordered diagonal form matrix $PMP^T$.

FIG. 36 presents the arrays DEG, VC and SN at completion of blocks 410 and 415.

FIG. 37 presents the arrays VC and SN at completion of each pass of outer loop in block 420 (search).

FIG. 39 presents the arrays TYPE, QUEUE and IQUEUE at completion of 4th and 5th passes of outer loop in block 430 (block 440 (cliques) excluded).

FIG. 41 presents the arrays TYPE, QUEUE and IQUEUE at completion of 4th and 5th passes of outer loop in block 430.

FIG. 42 presents the blocks in the flowchart of program roadmap and the corresponding hardware implementation processors.

FIG. 44 presents the detailed correspondence between the modules of the software and hardware implementations.

DESCRIPTION AND OPERATION OF A PREFERRED EMBODIMENT

1. General Purpose—The solution of linear systems of equations $$Mx=b,$$

in which M is a large sparse symmetric matrix, forms the most central piece in many critically important and computationally demanding applications in government and industry. In the majority of these applications, there is significant parallelism hidden in the structure of the sparse matrix M. The larger and sparser the matrix M, the greater the opportunities for parallelism. The invention in this patent application provides a fully automated system for exploiting the sparsity structure of the problem and subsequently generating computational tasks which can then be processed independently of each other by the different processors within a parallel architecture high performance computer. The automatic decomposition and allocation of independent computational tasks may lead to potentially large savings in computer execution time and storage.

2. Background—Gaussian elimination is the most fundamental direct method for solving linear systems of equations. If a sparse linear system of equations is solved by Gaussian elimination, many of the zero elements in the matrix M become nonzero at the completion of the elimination. The new nonzero elements created in this process of elimination are referred to as fill elements. A major objective in sparse matrix computations is to keep the number of fill elements small. Reduction in the number of fill elements translates into large savings in computer execution time and storage.

Great progress has been made in the area of solving large sparse linear symmetric systems of equations on traditional single processor computers since the mid-1950's [2]. In sharp contrast to these traditional computers, today's high performance computers consist of multiple processors integrated together to form a single parallel machine. In such parallel architecture machines, the processors work together to solve a single large problem.

This invention concerns a computerized "parallelization tool" for facilitating the solution of large sparse symmetric systems of equations on parallel architecture machines. The parallelization tool accomplishes two main objectives. First, the tool identifies in the original problem computational tasks that can be executed in parallel on the different processors of the parallel machine. Second, the tool selects these computational tasks in such a way that the number of fill elements produced at the completion of the solution process is small.

The currently available algorithms for the solution of large sparse symmetric systems of equations lack the parallelization tool presented in this invention.

Figure 1:
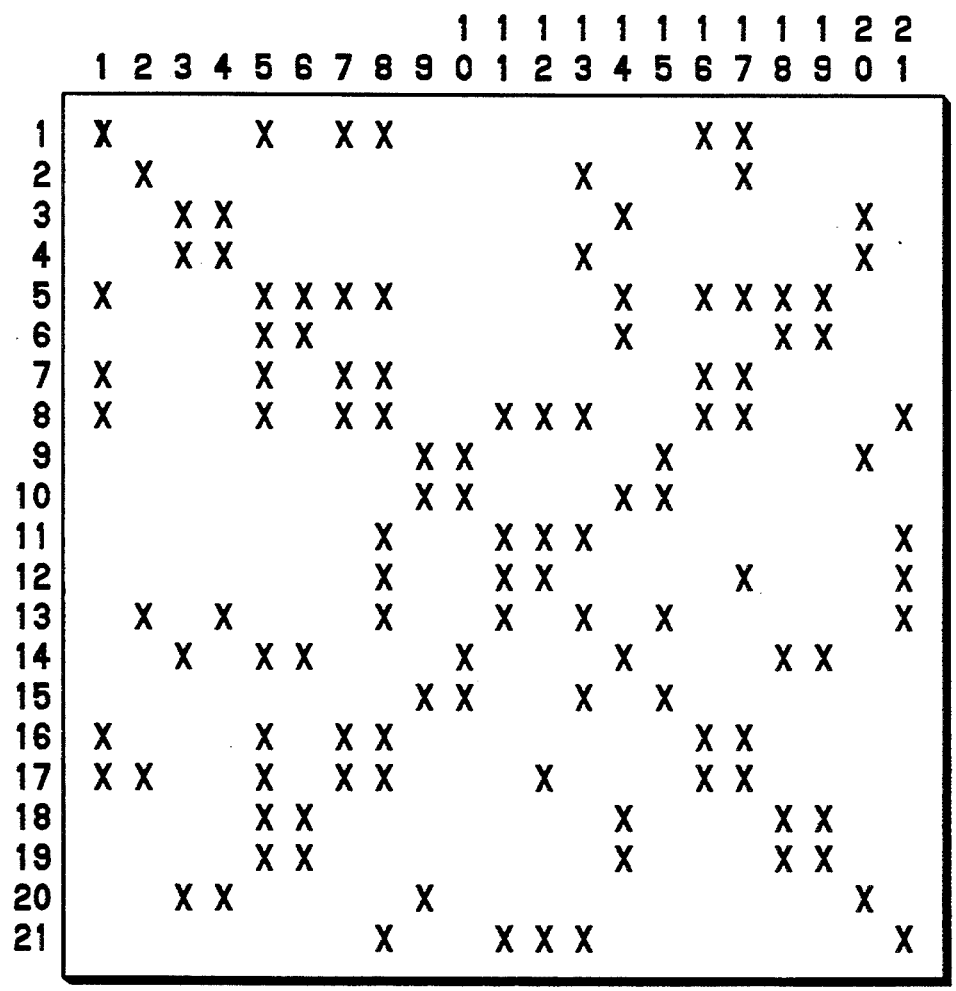
FIG. 1 depicts the sparsity structure of a typical symmetric 21×21 matrix M which is used as an illustrative example.
Figure 2:
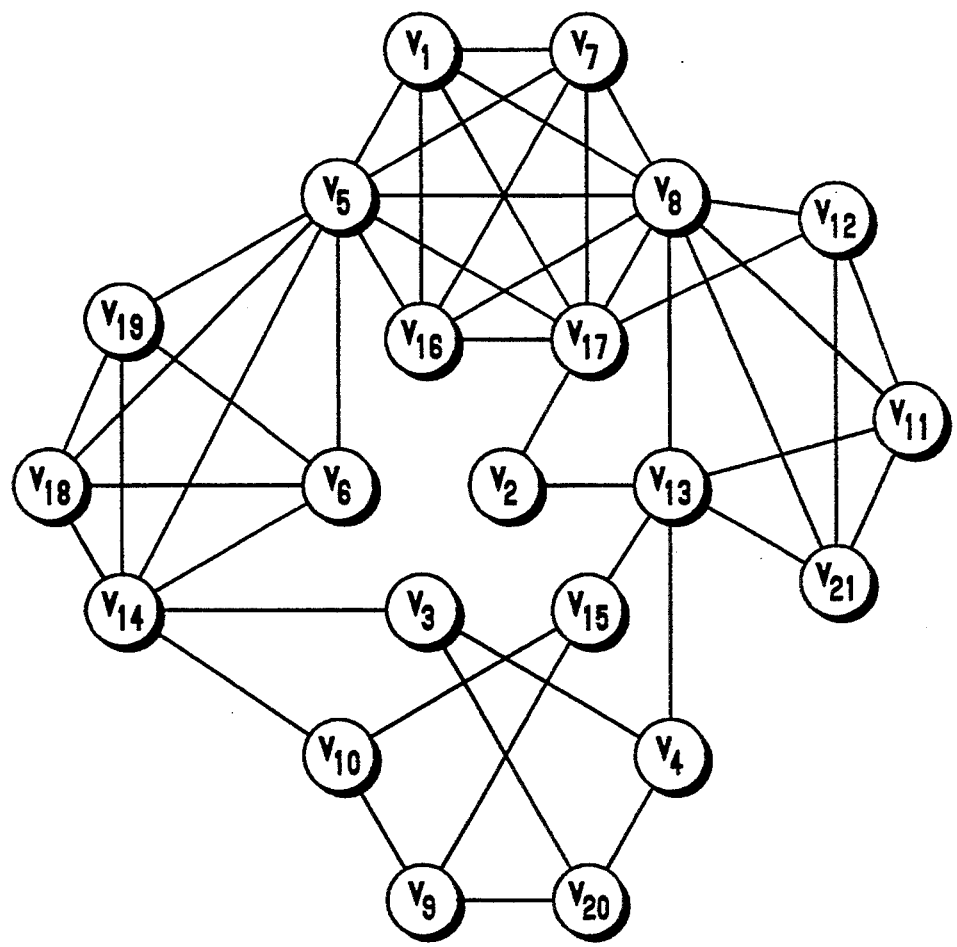
FIG. 2 depicts the undirected graph G of the matrix M.

3. Description and Operation—We model the zero—nonzero structure of a symmetric matrix using an undirected graph and exploit the parallel properties of the matrix using this graph. An undirected graph is a pair G=(V, E) where V is a set of $|V|$ elements called vertices and E is a set of $|E|$ unordered vertex pairs called edges. Given any n×n symmetric matrix M=[m] we can model the zero—nonzero structure of M by an undirected graph G=(V, E) where vertex $v_i$ corresponds to row i of M and edge $(v_i, v_j)$ is in E if and only if $m_{ij} \neq 0$ for all $i \neq j$. FIG. 1 shows a 21 by 21 symmetric matrix M. Each 'x' in FIG. 1 denotes a nonzero element in M while the blanks denote zero elements. The undirected graph G=(V, E) of matrix M is shown in FIG. 2. Since M is a 21 by 21 matrix, the vertex set V has 21 vertices with vertex $v_1$ corresponding to row 1, vertex $v_2$ corresponding to row 2, and so on. The edges incident with a vertex $v_1$ represent the off-diagonal nonzero elements in row i. For example, consider row 9 of matrix M. The off-diagonal nonzero elements in row 9 lie in columns 10, 15 and 20 and so there must be exactly three edges incident with vertex $v_9$ in G. One edge connects $v_9$ to $v_{10}$, another connects $v_9$ to $v_{15}$ and the third one connects $v_9$ to $v_{20}$. This can be easily verified by inspecting FIG. 2. All properties pertaining to parallelism in matrix M are contained in graph G.

There are several representations for graphs in scientific computing. A popular and commonly used representation for a graph is by means of adjacency lists [1]. The adjacency list for a vertex v is a list ADJ(v) of all vertices adjacent (that have connection) to vertex v. If we go back to our previous example and consider vertex $v_9$, then the adjacency list for $v_9$ is given by ADJ($v_9$)=($v_{10}$, $v_{15}$, $v_{20}$) since $v_{10}$, $v_{15}$ and $v_{20}$ are the only three vertices in G that are connected to vertex $v_9$ by an edge. In addition to adjacency lists, we make extensive use of the notion "degree" of a vertex. For any vertex v in G, the degree of v, denoted by $deg_G V$, is the number of edges incident with v in G, and so the degree of a vertex is equal to the size of its adjacency list which means that $deg_G v_i = |ADJ(v_i)|$ for all $v_i$ in V. The complete list of adjacency lists for the 21 vertices $v_1$ through $v_{21}$ in V is given in FIG. 3.

Figure 4:
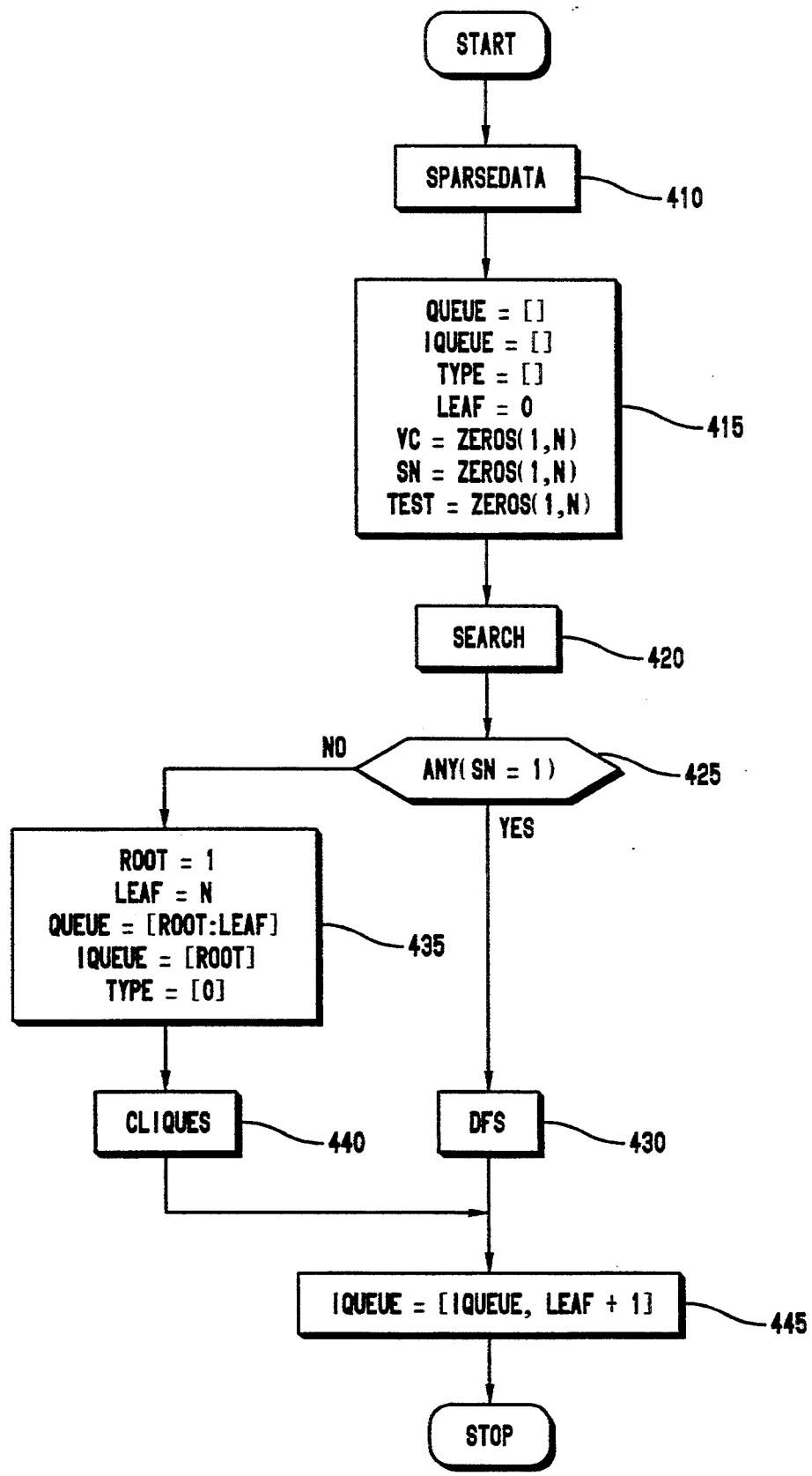
FIG. 4 is a flowchart which depicts the relationship of the primary subsystems defining the presently disclosed pre-processor in terms of its primary functional modules; this block diagram may be used to derive a special-purpose program, called herein roadmap, which, when installed in a general purpose computer such as the front-end computer which operates the suite of processors in a parallel architecture computer, converts it into the special-purpose pre-processor disclosed herein; the details of the primary modules are presented in FIGS. 5–13 following.
Figure 22:
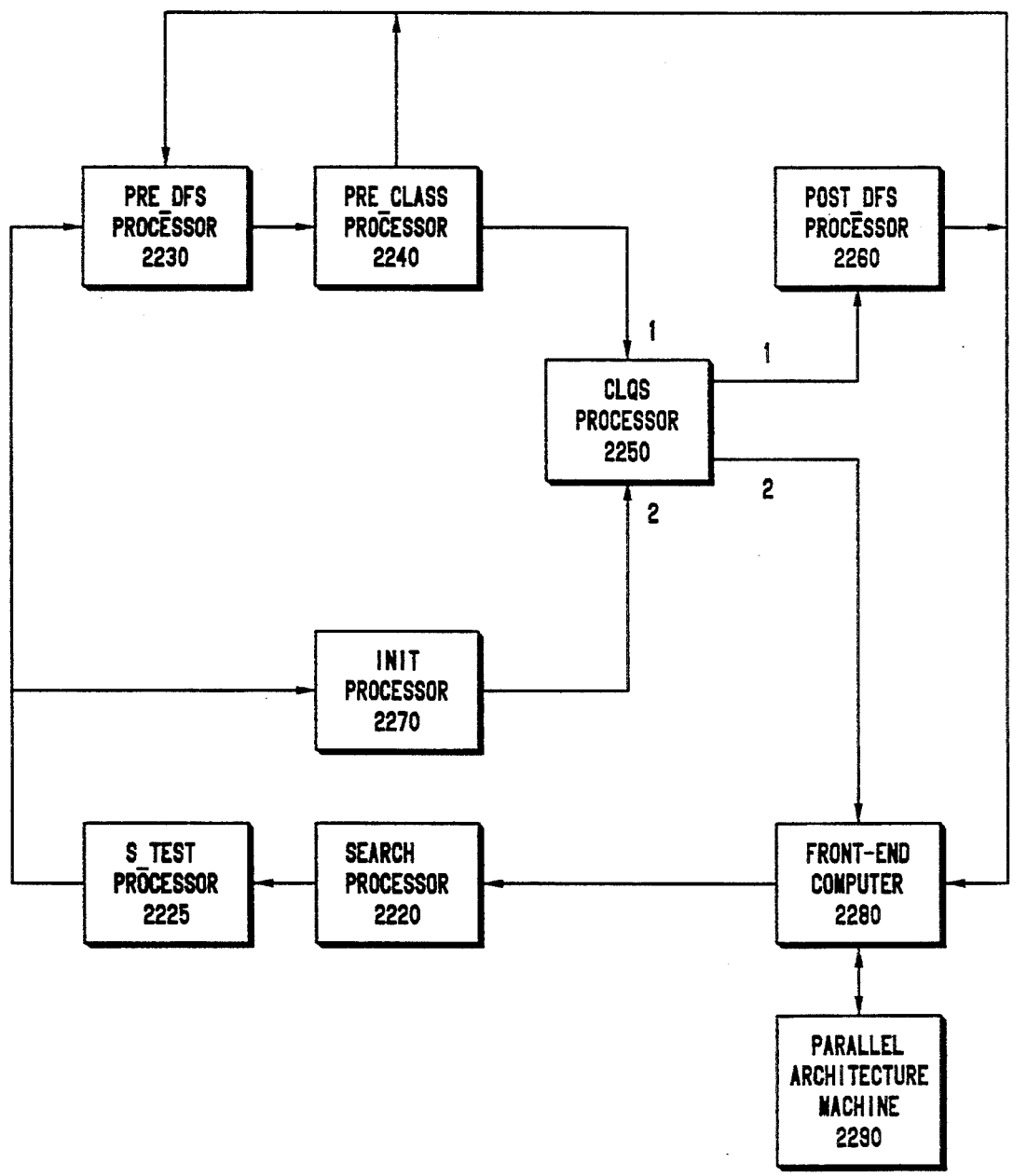
FIG. 22 presents a block diagram of a hardware implementation.

The computer program that implements the present invention is called "roadmap." A block diagram representation of roadmap is given in FIG. 4. There are four major blocks in roadmap. These are sparsedata (block 410), search (block 420), dfs (block 430) and cliques (block 440). As for the remaining four blocks, three blocks are used for initializing and updating arrays and parameters used in the invention and one block is used to validate a condition. The flowcharts for blocks 410, 420, 430 and 440 are given in FIGS. 5, 6, 7 and 8 respectively. FIG. 9 gives the flowchart for block 770 (classify) in dfs while FIGS. 10 through 13 give the combined flowchart for block 860 (maxclq) in cliques. The invention roadmap has been implemented using a widely available and popular linear algebra package called MATLAB [4]. The computer implementation of roadmap including its procedures search, dfs, component, classify, cliques, and maxclq is presented in FIGS. 14 through 21 respectively. The comments placed in the computer implementation conform with the high-level language adopted in the development of the theoretical work [3] supporting this invention. A hardware implementation of the invention is depicted in FIG. 22.

Block 410 (called sparsedata) in roadmap handles the input data needed for the execution of the program roadmap. These are vertices in V. Each vertex $v_i$ in V is stored in the computer the dimension n of matrix M and the adjacency lists of the n memory using its label i while the adjacency lists of the vertices are stored using two single arrays IADJ and LADJ. The array LADJ is formed by concatenating the n adjacency lists ADJ(1) through ADJ(n) in that order while IADJ is an n+1 array of pointers to the first vertex in each of the n adjacency lists as well as to the end of the array LADJ. The pair of arrays (IADJ, LADJ) is referred to in the literature as the adjacency structure pair [2]. For illustration, consider the arrays LADJ and IADJ in FIG. 15. Since IADJ(1)=1 and IADJ(2)=6, LADJ(1) =1 is the first vertex in adjacency list ADJ(1) and LADJ(6)=13 is the first vertex in adjacency list ADJ(2) which means that $$ADJ(1) = LADJ(IADJ(1):IADJ(2) - 1)$$
$$= LADJ(1:5)$$
$$= (5, 7, 8, 16, 17).$$

This can be verified by inspecting the list of adjacency lists given in FIG. 3. Thus in the general case, $$ADJ(i)=LADJ(IADJ(i):IADJ(i+1)-1)$$

for all i=1 through n. Also, if DEG is an n array consisting of the degrees of vertices 1 through n in that order, then DEG=IADJ(2:n+i)-IADJ(i:n) since DEG(1)=IADJ(2)-IADJ(1), DEG(2)=IADJ(3)-IADJ(2) up to DEG(n)=IADJ(n+1)-IADJ(n). The computation of DEG is done in block 590 in FIG. 5. Block 410 also monitors the integrity of the input data by checking the validity of three relations. These are: $|IADJ|=n+1$, $|LADJ|=IADJ(|IADJ|)-1$, and LADJ(i) $\leq$ n for all i $\leq |LADJ|$. If any of these three conditions is violated, the program halts and prints the message "check data." The program roadmap also halts if the equality $|LADJ|=n\times(n-1)$ holds since the off-diagonal part of matrix M will be full.

The invention in this patent application comprises four major steps. These are:
1) Computing the set S={v | there is an edge (v,w) in E with $deg_G v > deg_G w$};
2) Computing connected components of induced subgraph G(V-S);
3) Classifying the clique connected components of G(V-S);
4) Computing independent cliques in each nonclique connected component.

The clique connected components computed in 2) together with the independent cliques computed in 4) form the parallel regions produced by this invention.

Block 420 (called search) in roadmap computes the set of vertices S defined in step 1). This block in roadmap embodies the most novel part of the invention in this patent application. Block 420 computes S using a Boolean array SN setting the element SN(v)=1 if and only if vertex v is in the set S. Thus at the completion of block 420 we have S={v |SN(v)=1} and V-S={v |SN(v)=0}. The partitioning of the vertex set V into the two disjunct sets S and V-S is a crucial part of the way we exploit parallelism in connected sparse graphs.

At the completion of block 420, the set of vertices S is either empty or nonempty. If the set S is nonempty (or equivalently when the Boolean array SN contains at least one '1'), then the condition in block 425 in FIG. 4 is satisfied and so the program roadmap executes block 430. Otherwise the combination of blocks 435 and 440 are executed in that order. It is worth noting that the set S will be empty if and only if all vertices in V have the same degree. Graphs possessing this property are called regular. Regular graphs are not frequently encountered in real applications and so the path involving blocks 425 and 430 in FIG. 4 will be more frequently executed than the path involving blocks 425, 435 and 440.

Suppose G is not a regular graph, or equivalently the set S computed by block 420 is nonempty. Then block 430 (called dfs) computes the connected components of the induced subgraph G(V-S) using the depth-first search method [1], [5]. The connected components of G(V-S) are placed consecutively on the single array QUEUE. Pointers to the roots (starting vertices) of each connected component are placed on the single array IQUEUE. The arrays QUEUE and IQUEUE are initially set to empty in block 415 in FIG. 4. The connected components of the induced subgraph G(V-S) form the initial parallel regions produced by this invention. To elucidate the connection between connected components of G(V-S) and parallel regions produced by this invention, let $G(U_1)$ through $G(U_k)$ denote the connected components of the induced subgraph G(V-S). Since a connected component is a maximal connected subgraph, no vertex in any connected component of G(V-S) is adjacent to a vertex in any of the other k-1 connected components, and so each of these k connected components of G(V-S) is completely disconnected from any of the other k-1 connected components in G. It is this property that allows us to do computations on the equations corresponding to the connected components of G(V-S) independent of each other.

The connected components placed on the array QUEUE in block 430, may or may not be cliques (an induced subgraph G(U) is a clique if each vertex in U is adjacent to every other vertex in U). If a connected component G(U) is a clique, then the submatrix in M corresponding to G(U) is a full matrix and so there is no further parallelism to exploit in such a connected component. While cliques have no sparsity structure to exploit, it has been shown in [3] that every clique in a graph can be classified into one of four distinct types. To see this, let G(U) be any clique in G, and let $N_GU$ be a set of vertices in G defined by $N_GU=\{v\epsilon V-U \mid v$ is adjacent to a vertex in U}. Then one of the following two conditions must hold.

(a) For any u in U, u is adjacent to each vertex in $N_GU$ and no other vertex in V-U, (b) For any v in $N_GU$, v is adjacent to all other vertices in $N_GU$.

Figure 23:
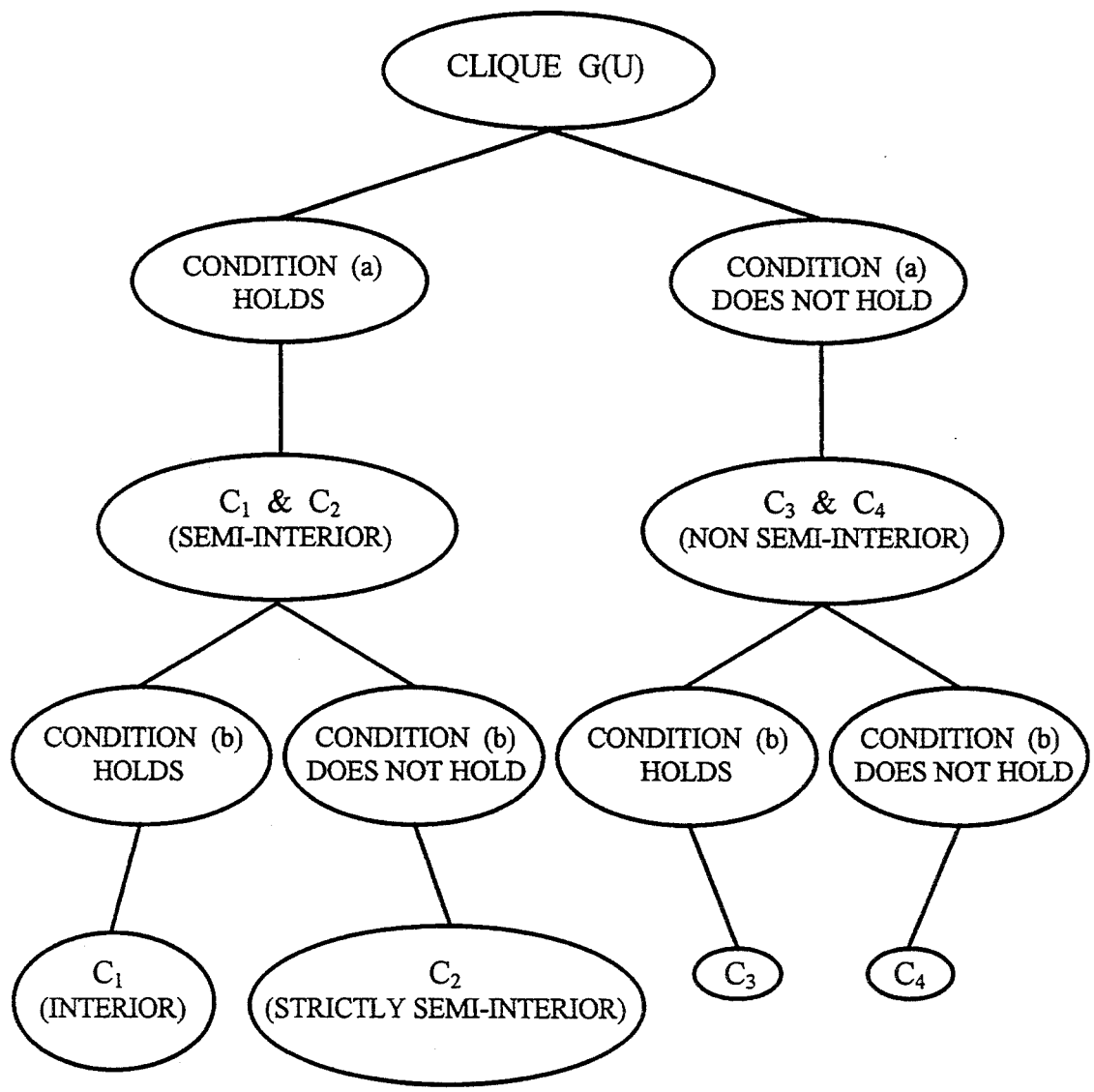
FIG. 23 presents a decision tree illustrating the four types of cliques.

With these two conditions, each clique G(U) in a graph G is classified into one of four distinct types. These are: Type $C_1$—G(U) satisfies both conditions (a) and (b) ; Type $C_2$—G(U) satisfies condition (a) and not (b); Type $C_3$—G(U) satisfies condition (b) and not (a); Type $C_4$—G (U) satisfies neither condition (a) nor (b). FIG. 23 gives the roadmap that highlights the connections between these four types of cliques. We call the cliques of types $C_1$ and $C_2$ semi-interior cliques. Also we call type $C_1$ cliques interior and type $C_2$ cliques strictly semi-interior. By these definitions, all cliques in a graph are either semi-interior or non semi-interior. Furthermore If any clique G(U) is semi-interior, then it is either interior or strictly semi-interior. The set of vertices $N_GU$ is called in [3] the neighborhood of U in G.

Figure 10:
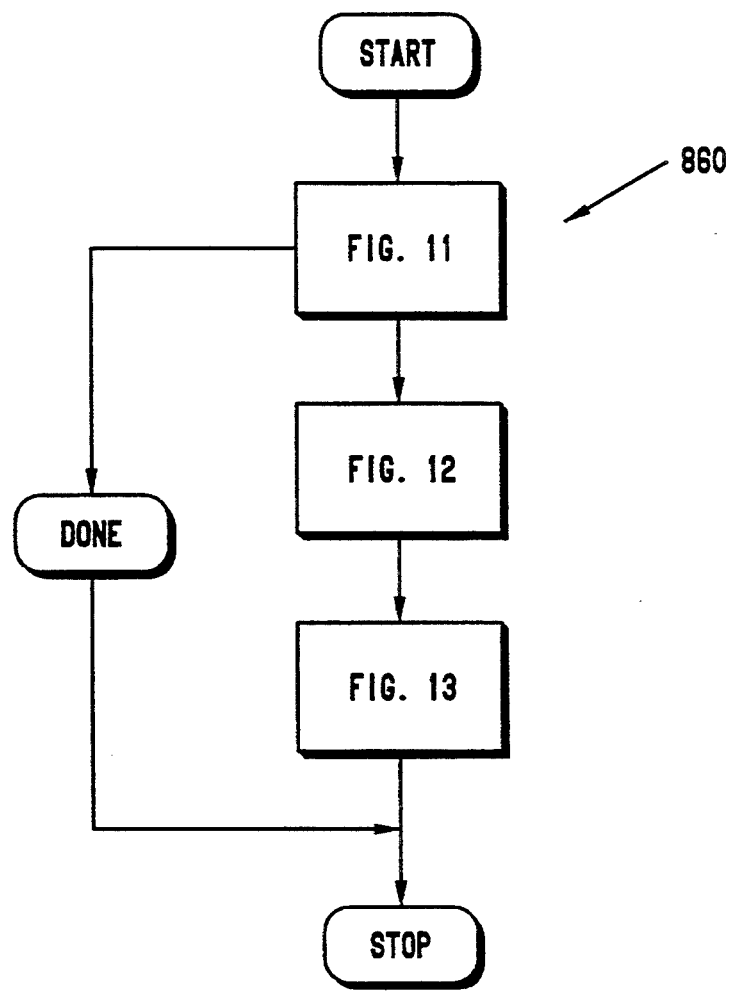
FIG. 10 is a flowchart which depicts the relationship between FIG. 11 and FIG. 12 and FIG. 13, which in combination define the module maxclq in functional terms.

The ranking of the connected components of G(V-S) into cliques and noncliques and the classification of the cliques into types $C_1$ through $C_4$ are both done in block 770 (called classify) in FIG. 10. The single array TYPE provides all information on whether a connected component G(U) of G(V-S) is a clique or not and also the type of clique G(U) is. If G(U) denotes the kth connected component computed by dfs, then the following convention is used to classify the connected components.

$$TYPE(k) = \begin{cases} 0 & G(U) \text{ is not a clique} \\ 1 & G(U) \text{ is type } C_1 \text{ clique (interior)} \\ 2 & G(U) \text{ is type } C_2 \text{ clique (strictly semi-interior)} \\ -2 & G(U) \text{ is type } C_1 \text{ or } C_2 \text{ clique (semi-interior)} \\ 3 & G(U) \text{ is type } C_3 \text{ or } C_4 \text{ clique} \end{cases}$$

The array TYPE is initially set to empty in the initialization block 415 in FIG. 4. We use the equality in block 910 in FIG. 9 to find out if a connected component G(U) computed by dfs is a clique or not. If the equality holds, then G(U) is a clique. Subsequently results derived in [3] are used to carry out the classification of G(U) into the types $C_1$ through $C_4$.

Assume the equality in block 910 does not hold. Then the connected component G(U) is not a clique. Subsequently we add 0 to the end of array TYPE in block 1080, and then call block 440 (called cliques) to compute independent cliques in G(U). Note that block 440 is also called in roadmap when the set of vertices S computed by block search is empty, or equivalently when G is a regular graph. This means that roadmap uses block 440 (cliques) to compute independent cliques in a regular graph as well as in a nonclique connected component of the induced subgraph G (V-S).

Given any nonclique connected component G(U) of G(V-S), block 440 computes t ($t \geq 1$) distinct sets of vertices $U_1$ through $U_t$ such that G ($U_1$) is a maximal clique in G(U), $G(U_2)$ is a maximal clique in the subgraph of G(U) obtained by deleting $U_1$ and all vertices adjacent to $U_1$, $G(U_3)$ is a maximal clique in the subgraph of G(U) obtained by deleting all vertices in the union $(U_1 \cup U_2)$ and all vertices adjacent to $(U_1 \cup U_2)$, and so forth.

By this construction, no vertex in any of the t maximal cliques is adjacent to a vertex in any of the other t-1 maximal cliques computed by block 440, and so $G(U_1)$ through $G(U_t)$ are independent cliques of G(U).

For the undirected graph G=(V, E) in FIG. 2, the Boolean array SN is as follows at the completion of block 420:

SN=[00001001000011001000], and so we get

S={$v_5$, $v_8$, $v_{13}$, $v_{14}$, $v_{17}$} and $$V-S = \{v_1, v_2, v_3, v_4, v_6, v_7, v_9, v_{10}, v_{11}, v_{12}, v_{15}, v_{16}, v_{18}, v_{19}, v_{20}, v_{21}\}.$$

Consider vertex $v_5$ in the set S. From FIG. 2, $(v_5, v_6)$ is an edge in E with $DEG(v_5) > DEG(v_6)$, and so vertex $v_5$ must belong to the set S. Now consider vertex $v_3$ in the other set V-S. From FIG. 2 we note that for the three edges $(v_3, v_4)$, $(v_3, v_{14})$ and $(v_3, v_{20})$ incident with $v_3$ the following three inequalities hold: $DEG(v_3) \leq DEG(v_4)$, $DEG(v_3) < DEG(v_{14})$ and $DEG(v_3) \leq DEG(v_{20})$. Thus $v_3$ does not belong to the set S, or equivalently $v_3$ must belong to the set V-S. The correctness of the remaining parts of the sets of vertices S and V-S can be verified using FIG. 2.

Since the set S is nonempty, the condition in block 425 in FIG. 4 is satisfied and so roadmap calls block 430. To facilitate the description of block 430, we will execute roadmap twice. The first execution of roadmap will exclude the call to block 440 in FIG. 9 while the second execution will include all blocks in roadmap.

At the completion of roadmap (block 440 excluded) the arrays TYPE, QUEUE and IQUEUE are as follows.

TYPE = [−2, −2, 0, −2, 3],
QUEUE = [1,7,16,2,3,4,20,9,10,15,6,18,19,11,12,21],
and
IQUEUE = [1, 4, 5, 11, 14, 17].

Since the array TYPE has length 5, the induced subgraph G(V-S) has five connected components. These five connected components are stored on the single array QUEUE one at a time in the order they get computed in roadmap. The first five integers on the array IQUEUE are the pointers to the starting vertices (roots) of the five connected components placed on the array QUEUE. Thus the first integer 1 on IQUEUE points to the starting vertex $v_1$ of the first connected component $G(U_1)$ of G (V-S) computed by dfs, the second integer 4 on IQUEUE points to the starting vertex $v_2$ of the second connected component $G(U_2)$ up to the fifth integer 14 on IQUEUE which points to the starting vertex $v_{11}$ of the fifth and last connected component $G(U_5)$ computed by dfs. The sixth integer 17 placed on array IQUEUE is the pointer to the end of the array QUEUE. The connections between these three arrays are highlighted in FIG. 24. Thus the sets of vertices in the five connected components computed by roadmap are as follows.

$U_1 = \{v_1, v_7, v_{16}\}$,
$U_2 = \{v_2\}$,
$U_3 = \{v_3, v_4, v_{20}, v_9, v_{10}, v_{15}\}$,
$U_4 = \{v_6, v_{18}, v_{19}\}$,
$U_5 = \{v_{11}, v_{12}, v_{21}\}$.

Figure 25:
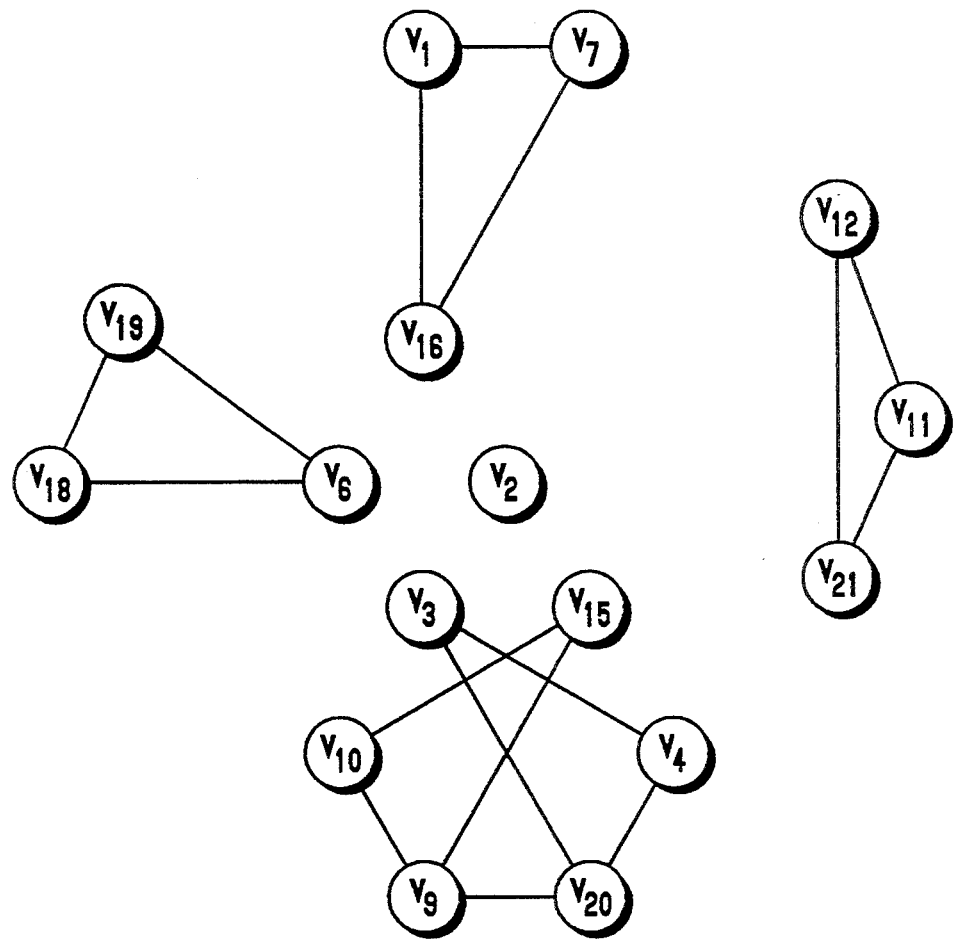
FIG. 25 depicts the induced subgraph of G(V-S).

FIG. 25 shows the induced subgraph G(V-S). This figure also shows that $G(U_1)$ through $G(U_5)$ are maximal connected subgraphs in G and so $G(U_1)$ through $G(U_5)$ constitute the connected components of the induced subgraph G(V-S).

Figure 26:
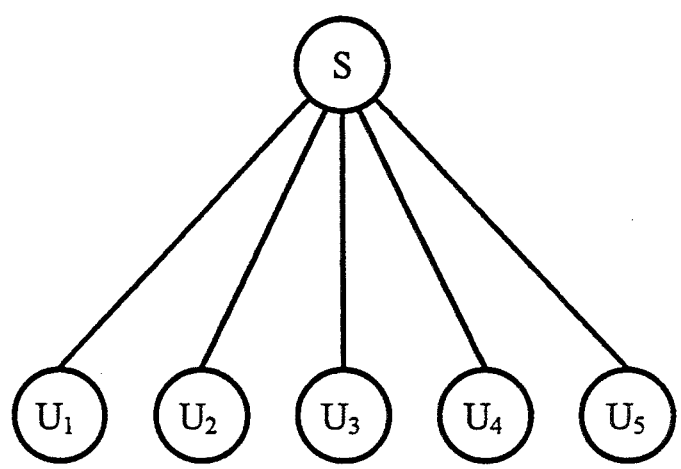
FIG. 26 depicts the star-shaped graph $G_\pi$ produced by roadmap (block cliques excluded).

Next considered is the structure of G resulting from the partitioning of the vertex set V into the disjunct sets $U_1$ through $U_5$ and S. In the general case, let $$\Pi = (v_1, v_2, \ldots, v_k)$$

be any vertex partition in G. Given $\Pi$, a graph $G_{9\pi}$ can be formed in which each vertex consists of an element of $\Pi$. The edges in $G_\pi$ are defined as follows: There is an edge in $G_\pi$ from vertex $V_1$ to another vertex $V_j$ if and only if a vertex in the set of vertices $V_i$ is adjacent in G to a vertex in the set of vertices $V_j$. Thus in the case where $\Pi = \{U_1, U_2, \ldots, U_5, S\}$, the graph $G_\pi$ takes the star-shaped form in FIG. 26 with root vertex S and leaf vertices $U_1$ through $U_5$.

Since no leaf vertex in $G_\pi$ is adjacent to any of the other leaf vertices, all computations carried out on the equations corresponding to the connected components $G(U_1)$ through $G(U_5)$ can be done independently of each other. In view of this, the five leaf vertices in $G_\pi$ correspond to parallel regions of computations.

Figure 27:
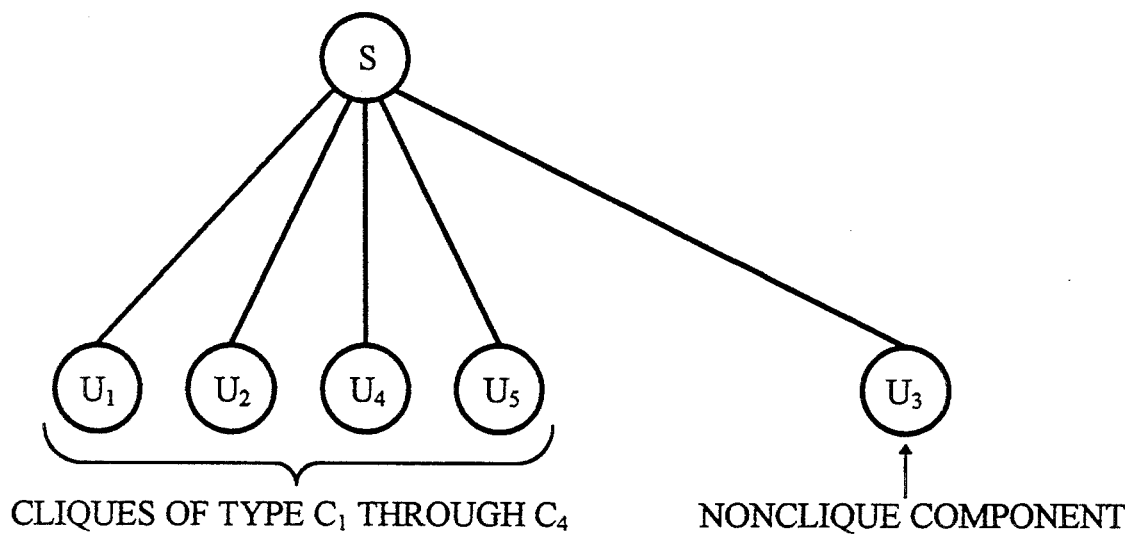
FIG. 27 depicts the grouping of leaf vertices in $G_\pi$ into cliques and noncliques.

By the array TYPE, the connected components computed by dfs can be partitioned into two groups. One group will contain the clique components $G(U_1)$, $G(U_2)$, $G(U_4)$ and $G(U_5)$ while the other group will consist of the nonclique connected component $G(U_3)$. FIG. 27 shows the star-shaped graph $G_\pi$ with its leaf vertices partitioned into clique and nonclique components.

The main objective of block 440 (called cliques) is to compute independent cliques in the leaf vertices of $G_\pi$ corresponding to nonclique connected components. So let us execute roadmap once more, now with the call to block 440 included. Then at the completion of roadmap, the arrays QUEUE and IQUEUE are as follows.

QUEUE = [1,7,16,2,3,4,20,10,15,9,6,18,19,11,12,21],
and
IQUEUE = [1, 4, 5, −8, −10, 11, 14, 17].

Since the connected component $G(U_3)$ is not a clique, the third integer on IQUEUE (pointer to the starting vertex of $G(U_3)$) is also the pointer to the starting vertex of the first independent clique G(U′) computed by block cliques in connected component $G(U_3)$. The negative integer −8 immediately following 5 is the starting vertex of the second independent clique G(U″) computed in $G(U_3)$. The negative integer −10 immediately following −8 is the pointer to the first vertex in the set of vertices S′ = $U_3$ − U′ − U− placed on array QUEUE The overall relationship between TYPE, QUEUE and IQUEUE is highlighted in FIG. 28.

Figure 28:
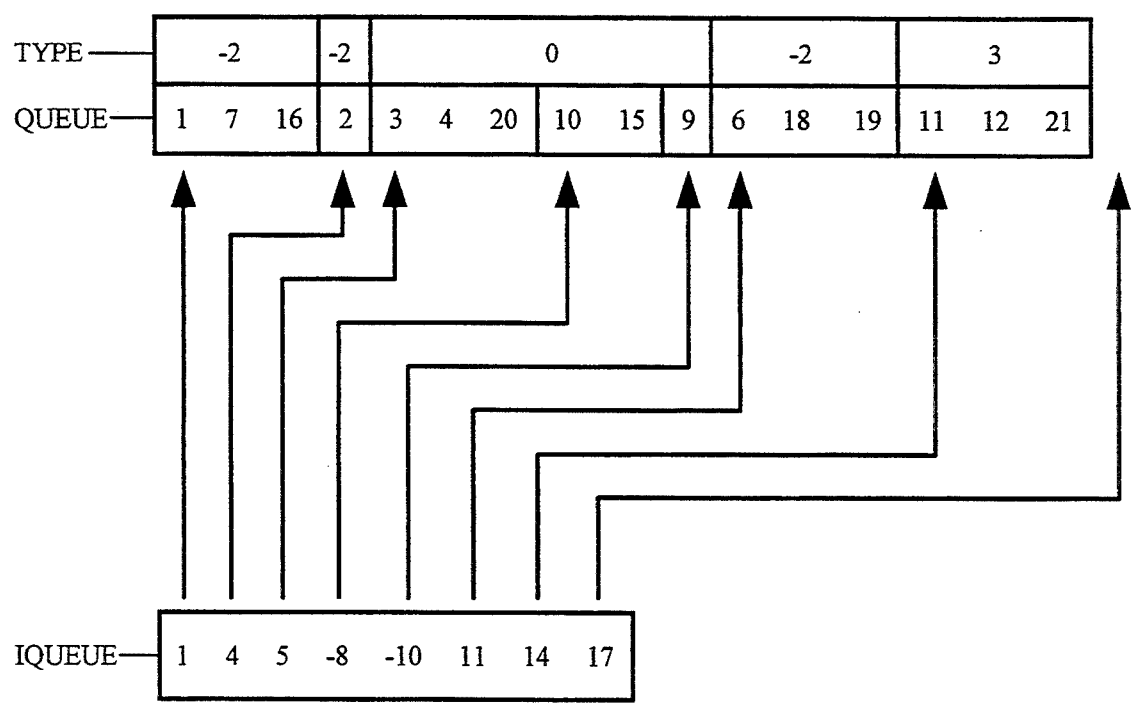
FIG. 28 presents roadmap output (block cliques included).
Figure 29:
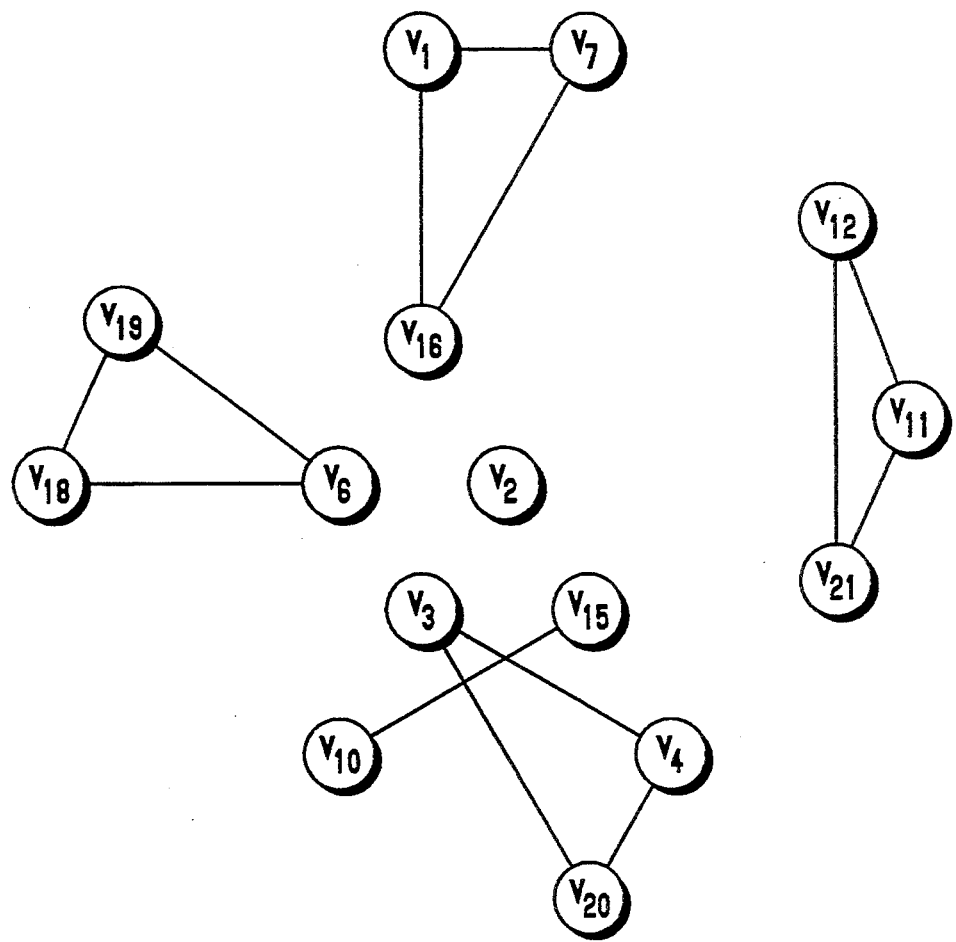
FIG. 29 depicts the induced subgraph G(V-S-S')

By FIG. 28 it can be observed that the application of block 440 to the connected component $G(U_3)$ has partitioned the vertices in $G(U_3)$ into three disjunct sets U′ = $\{v_3, v_4, v_{20}\}$,
U″ = $\{v_{10}, v_{15}\}$,
and
S′ = $\{v_9\}$, such that G(U′) and G(U″) are independent cliques of $G(U_3)$. FIG. 29 shows the induced subgraph G(V-S-S′).

Figure 30:
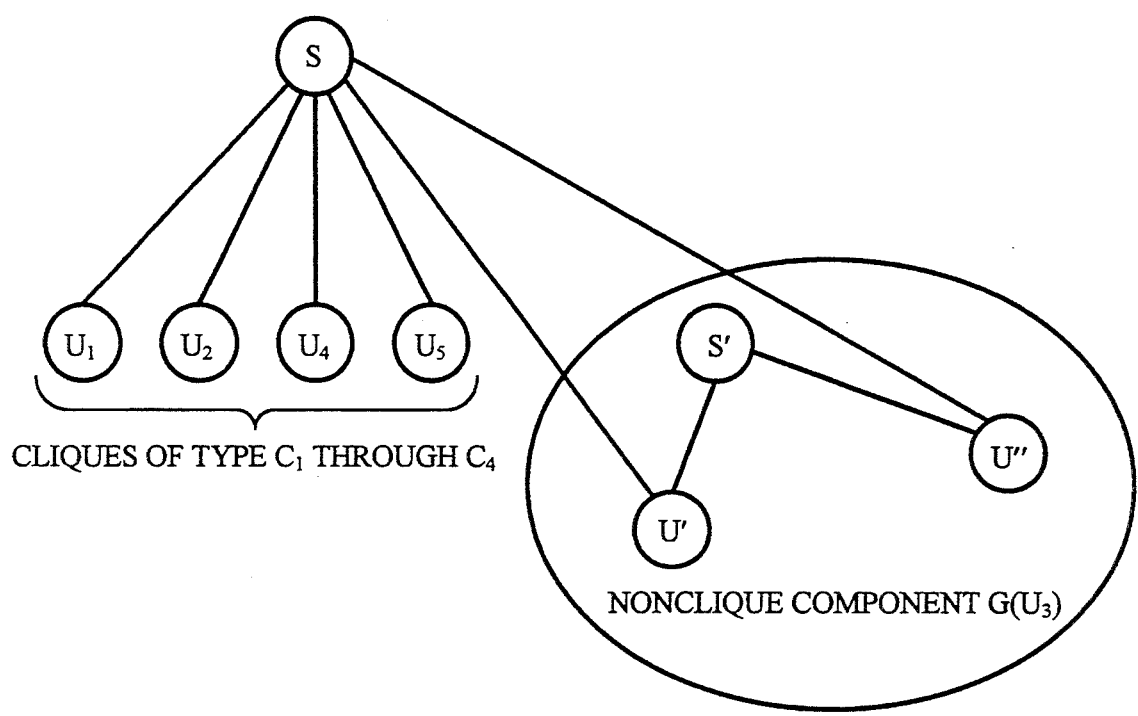
FIG. 30 depicts the star-shaped graph $G_{\pi'}$ produced by roadmap (block cliques included).

Since the sets of vertices U′, U″, and S′, form a partition of the vertex set $U_3$, it follows that $\Pi' = \{U_1, U_2, U_4, U_5, U', U'', S', S\}$ is also a vertex partition in G. FIG. 30 shows the graph $G_{\pi'}$.

Now suppose the sets of vertices S′ and S in Π′ are combined to form the following vertex partition $\Pi'' = \{U_1, U_2, U_4, U_5, U', U'', (S' \cup S)\}$.

Figure 31:
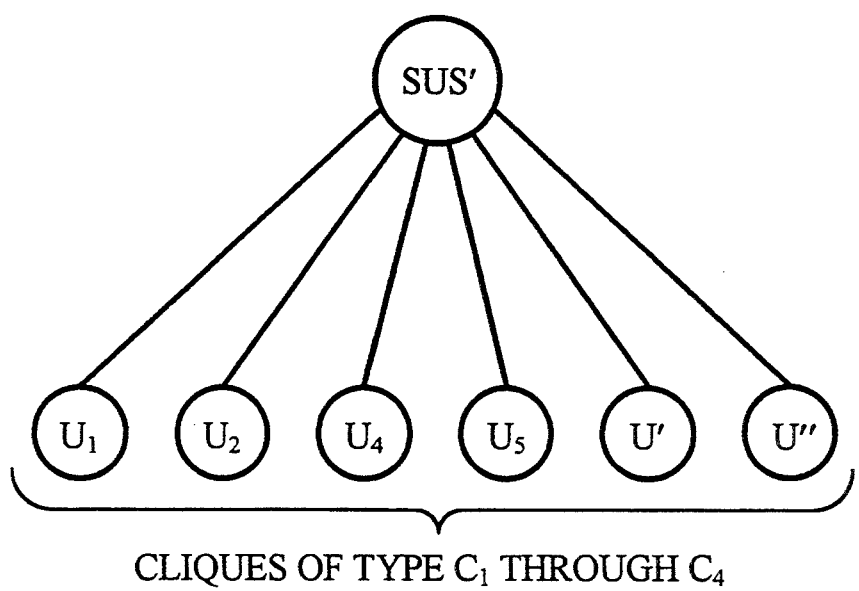
FIG. 31 depicts the star-shaped graph $G_{\pi'}$ produced by roadmap (block cliques included).

Then the graph $G_{\pi''}$ is a star-shaped graph with the root vertex $(S' \cup S)$ and leaf vertices $U_1$, $U_2$, $U_4$, $U_5$, U′ and U″. FIG. 31 shows the star-shaped graph $G_{\pi''}$. Unlike the star-shaped graph $G_\pi$ in FIG. 26, each leaf vertex in $G_{\pi'}$ is a clique, and so the application of program roadmap (including block cliques) to any sparse problem will lead to a computational scheme in which all computations are done on fully dense subsystems and independently of each other. The derivation of this solution strategy is our next topic.

Let A and D be square blocks in matrix M such that G (V-S'-S ) and G(S'∪S) are the graphs of blocks A and D respectively. Then there exists a permutation matrix P such that PMP TM is a 2 by 2 block matrix of the following form:

$$PMP^T = \begin{bmatrix} A & B \\ B^T & D \end{bmatrix}. \tag{1}$$

In the majority of problems arising in industrial applications [2], symmetric matrices are positive definite. For such matrices, the leading block A in (1) is nonsingular and so without any loss of generality we assume that there exists an upper triangular matrix U with non-zero diagonal entries such that $$A = U^T U \tag{2}$$

With this factored form of A, the block matrix PMP TM can be written in the following block product form $$PMP^T = \begin{bmatrix} U^T & 0 \\ X^T & I \end{bmatrix} \cdot \begin{bmatrix} U & X \\ 0 & D - X^T X \end{bmatrix} \tag{3}$$

in which I is an identity matrix, the 0's are zero matrices and the block X satisfies the following triangular system with multiple right hand sides:

$$U^T X = B \tag{4}$$

The matrix $D-X^TX$ is the familiar Schur complement of A in PMP TM.
The correctness of the block product form (3) can be verified by multiplication.

Since the permutation matrix P is orthogonal, it follows that $p^T = p^{-1}$ and so the system of equations Mx=b takes the following equivalent form $$(PMP^T)(PX) = (Pb) \tag{5}$$

Consider this system where PMP TM has been factored into the block product form in (3) and the vectors Px and Pb have been partitioned conformably into the direct sums of y and z, and f and h respectively. The system of equations (5) then becomes $$\begin{bmatrix} U & X \\ 0 & D - X^T X \end{bmatrix} \begin{bmatrix} y \\ z \end{bmatrix} = \begin{bmatrix} w \\ h - X^T w \end{bmatrix}, \tag{6-a}$$

where $$U^T w = f \tag{6-b}$$

So by combining (4) and (6) there is obtained the following systems of equations $$U^T[Xw] = [Bf], \tag{7-a}$$

$$[D - X^T X]z = h - X^T w, \tag{7-b}$$

$$Uy = w - Xz \tag{7-c}$$

The system of equations (7-a) is a lower triangular system with multiple right hand sides. The solution of this system provides the block X and the vector w. Subsequently the solution of the system of equations (7-b) provides the vector z which is part of the unknown vector x. Lastly, the solution of the system of equations (7-c) yields the remaining part y of the unknown vector x.

The solution strategy in (7) was obtained by considering any arbitrary 2 by 2 block matrix PMP TM in which the leading block A is nonsingular. Next we consider the particular structure of the block matrix corresponding to the star-shaped graph $G_{\pi'}$, produced by this invention, and subsequently we will modify the solution strategy in (7) to take full advantage of today's high performance parallel machines.

Let α be an ordering of the vertices in the graph G in FIG. 2 obtained by selecting vertices from the vertex sets $U_1$, $U_2$, $U_4$, $U_5$, U' and U" (leaf vertices in $G_{\pi'}$,) and the vertex set S'∪S (root vertex in $G_{\pi''}$) in that order. Then one possible vertex ordering of G is the following 21-tuple:

$\alpha = (\alpha_1, \alpha_2),$ $\alpha_1 = (v_1, v_7, v_{16}, v_2, v_6, v_8, v_{19}, v_{11}, v_{12}, v_{12}, v_3, v_4, v_{20}, v_{10}, v_{15})$ $\alpha_2 = (v_{10}, v_{15}, v_9, v_5, v_8, v_{13}, v_{14}, v_{17}).$ Now let P be a permutation matrix such that row i of matrix PM corresponds to ith element of vertex ordering α. The matrix PMP TM is shown in FIG. 32. In compact form, PMP TM is a 7 by 7 block matrix of the following form $$PMP^T = \begin{bmatrix} A_{11} & & & & & & B_1 \\ & A_{22} & & & & & B_2 \\ & & \cdot & & & & \cdot \\ & & & \cdot & & & \cdot \\ & & & & \cdot & & \cdot \\ & & & & & A_{66} & B_6 \\ B_1^T & B_2^T & \cdot & \cdot & \cdot & B_6^T & D \end{bmatrix} \tag{8}$$

where the diagonal blocks $A_{11}$ through $A_{66}$ correspond to the six cliques $G(U_1)$, $G(U_2)$, $G(U_4)$, $G(U_5)$, G(U') and G(U") respectively. Matrices having the block bordered diagonal form in (8) have been used extensively in power system network problems and in the analysis, synthesis and solution of electrical circuits. Also, three fundamental methods in scientific computation (incomplete nested dissection, substructuring, and domain decomposition) lead to block matrices that have precisely the block bordered diagonal form in (8). The origins of block bordered diagonal matrices, however, go as far back as the early works of Gabriel Kron [4].

Consider now the case where PMP TM has the block bordered diagonal form in (8), block X has been partitioned conformably into the form $$X = \begin{bmatrix} X_1 \\ X_2 \\ X_3 \\ X_4 \\ X_5 \\ X_6 \end{bmatrix}. \tag{9}$$

and the vectors y, f and w have been partitioned conformably into the direct sums of $y_1$ through $y_6$, $f_1$ through $f_6$ and $w_1$ through $w_6$ respectively. Then the matrix factorization in (2) takes the form $$A_{ii} = U^T_{ii} U_{ii}, (i = 1, ..., 6),\qquad(10)$$

whereas the system of equations (7) becomes $$U^T_{ii}[X_i \; w_i] = [B_i \; f_i], \qquad(11\text{-}a)$$

$$\left[ D - \sum_{i=1}^{k} X_i^T X_i \right] z = h - \sum_{i=1}^{k} X_i^T w_i, \qquad(11\text{-}b)$$

$$U_{ii} y_i = w_i - X_i z, (i = 1, \ldots, 6). \qquad(11\text{-}c)$$

The solution strategy in (10) and (11) is ideally suited for high performance parallel machines. To begin with, the 6 diagonal blocks $A_{11}$ through $A_{66}$ of the pivot block A are factored in parallel on different processors of the parallel machine to produce 6 upper triangular matrices $U_{11}$ through $U_{66}$. Then, a total of 6 triangular systems with multiple right hand sides are solved in parallel on different processors to produce the blocks $X_1$ through $X_6$ and the vectors $w_1$ through $w_6$. Next, 6 matrix-matrix multiplies $X^T_1[X_1 \; w_1]$ through $X^T_6[X_6 \; w_6]$ are computed in parallel on different processors to produce the Schur complement $D-X^TX$ and the right hand vector $h-X^TW$ in equation (11-b). The solution of (11-b) produces the vector z. Subsequently, the vector y is obtained using (11-c) by solving another 6 triangular systems in parallel on different processors.

The allocation of independent computational tasks in an arbitrary sparse symmetric problem constitutes one of two key capabilities of the invention in this patent application. The other capability concerns the problem of keeping the number of fill elements in the solution strategy (10) and (11) small. This brings us to the next topic in this patent application.

In the majority of sparse matrix problems, the blocks B and D in the 2 by 2 block matrix PMP TM are sparse matrices whereas their counterparts X and $D-X^TX$ in the product form of PMP TM can be extremely dense if the permutation matrix P is not chosen with care. The sparser the block X and the Schur complement $D-X^TX$ are, the more efficient is the computation process.

Given any block diagonal pivot block A with full diagonal blocks, we have shown in [3] that the sparsity of block X and the Schur complement $D-X^TX$ are fully dictated by the classification of cliques into the four types $C_1$ through $C_4$. To summarize the results in [3] the concept of "structure" of a matrix is introduced. For any square or nonsquare matrix H, the structure of H is a 0−1 matrix str(H) obtained by replacing each nonzero entry of H with '1.' With this notation, it is easy to see that the block X and the Schur complement $D-X^TX$ have the same sparsity as the blocks B and D if and only if str(X)=str(B) and str($D-X^TX$)=str(D).

For clarity of presentation, consider any maximal clique G(C) in the induced subgraph G(V-S'-S). Then the following statements [3] pertaining to the sparsity of block X and the Schur complement $D-X^TX$ result.

(a) if G(C) is type $C_1$ clique (interior), then str(X)=str(B), str($D-X^TX$)=str(D).

(b) if G(C) is type $C_2$ clique (strictly semi-interior), then str (X)=str (B), (c) if G(C) is type $C_3$ clique, then str(X)$\neq$str(B), str($D-X^TX$)$\neq$str(D).

(d) if G(C) is type $C_4$ clique, then str(X)$\neq$str(B), str($D-X^TX$)$\neq$str(D).

Figure 33:
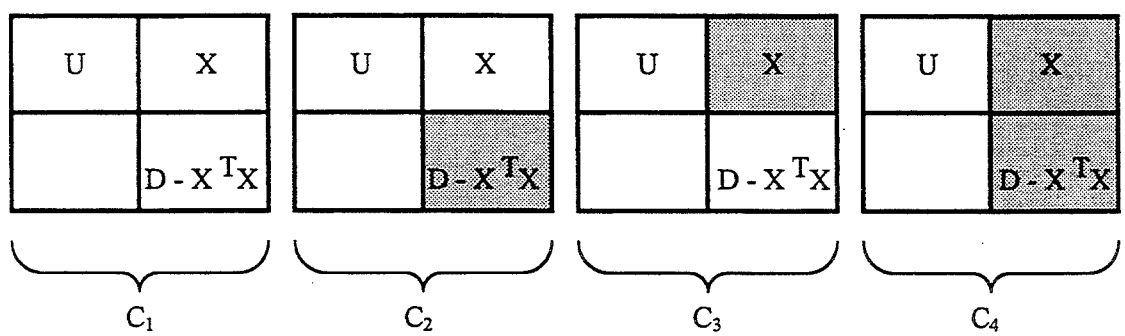
FIG. 33 depicts the sparsity preserving properties of type $C_1$ through $C_4$ cliques.

FIG. 33 visualizes these results by showing blocks X and $D-X^TX$ in dark whenever str(X)$\neq$str(B) and str($D-X^TX$)$\neq$str(D) respectively.

From properties (a) through (d), it is noted that interior cliques correspond to the most ideally suitable computational tasks for the solution strategy in (10) and (11) since the solution of these tasks will not give rise to any fill element in any part of the original matrix M. This fundamental property of an interior cliques brings us to the most novel part of the invention.

"Suppose S is the set of vertices generated by block 420 (search). Then every interior clique in the original graph G is a connected component of the induced subgraph G(V-S)."

This property of block 420 shows that the solution strategy derived from the application of this invention embodies the most ideally suitable computational tasks from the standpoint of keeping the number of fill elements small. From properties (b) through (d), however, it is also clear that G(V-S) may contain connected components that will lead to fill elements in the solution process. The consideration of these connected components will very much depend on the availability of processors in the parallel machine. More on this topic will be covered in subsequent developments.

To illustrate properties (a) through (d), the array TYPE computed by roadmap is examined below. Since TYPE [1]=TYPE[2]=TYPE[4]=−2, the three cliques G($U_1$), G($U_2$) and G($U_4$) placed on array QUEUE are semi-interior (type $C_1$ or $C_2$). The fourth clique G($U^5$) is not semi-interior since TYPE[5]=3. To verify this, consider the graph G of matrix M shown in FIG. 2. The neighborhoods of the four vertex sets $U_1$, $U_2$, $U_4$ and $U_5$ are respectively $N_GU_1=\{v_5, v_8, v_{17}\}$, $N_GU_2=\{v_{13}, v_{17}\}$, $\{v_5, v_{14}\}$ and $N_GU_5=\{v_8, v_{13}, v_{17}\}$. As can be seen from the graph in FIG. 2, each vertex every vertex in $N_GU_1$, $N_GU_2$ and $N_GU_4$ respect ive ly while the vertices $v_{12}$ and $v_{21}$ in $U_5$ are not adjacent to every vertex in $N_GU_5$. Thus the information provided by array TYPE is correct. Also, among the three semi-interior cliques computed by dfs, the cliques G($U_1$) and G($U_4$) are interior since the subgraphs induced by the neighborhoods $N_GU_1$ and $N_GU_4$ are cliques. The third semi-interior clique G($U_2$) is strictly semi-interior since the subgraph induced by the neighborhood $N_GU_2$ is not a clique.

Figure 34:
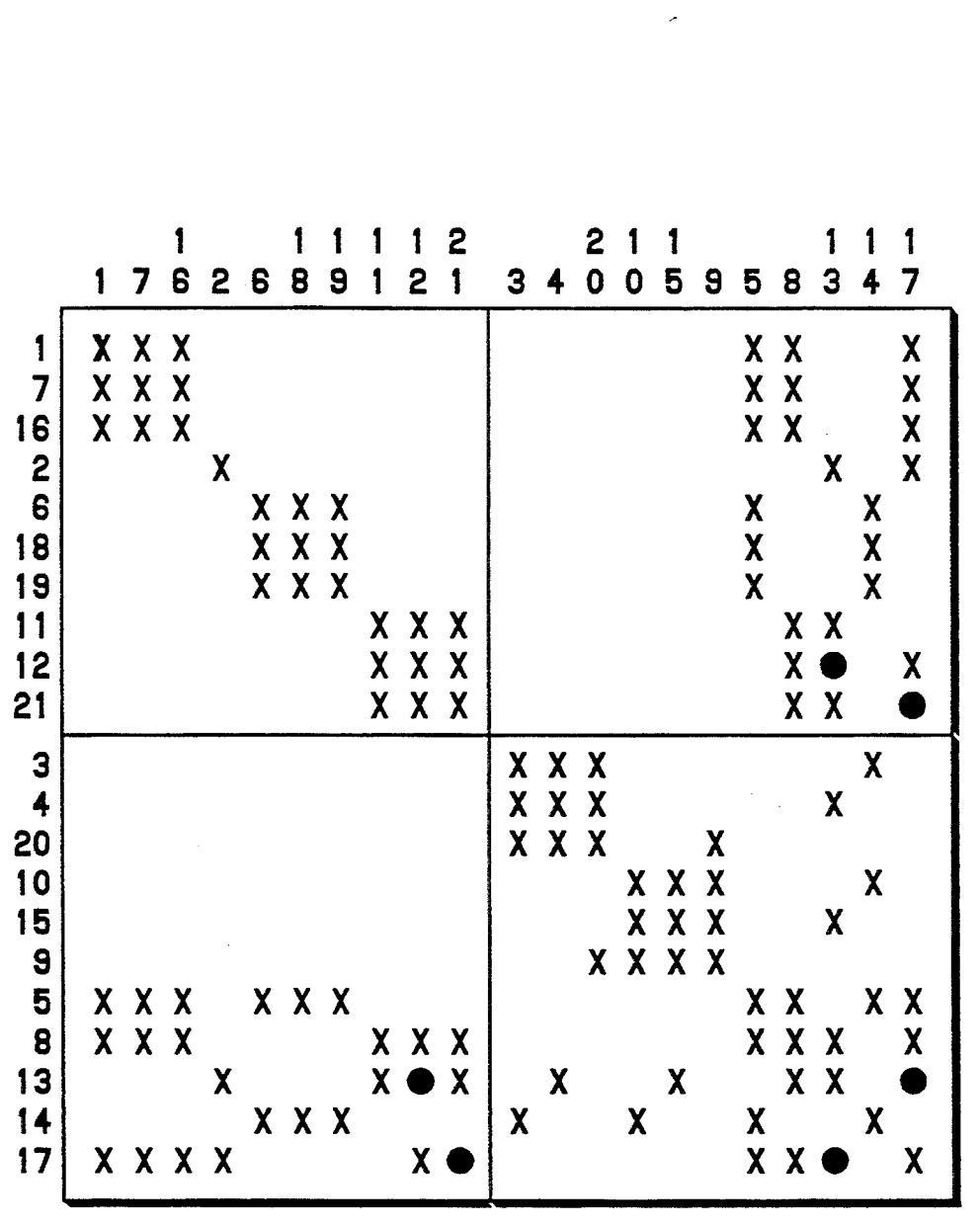
Figure 35:
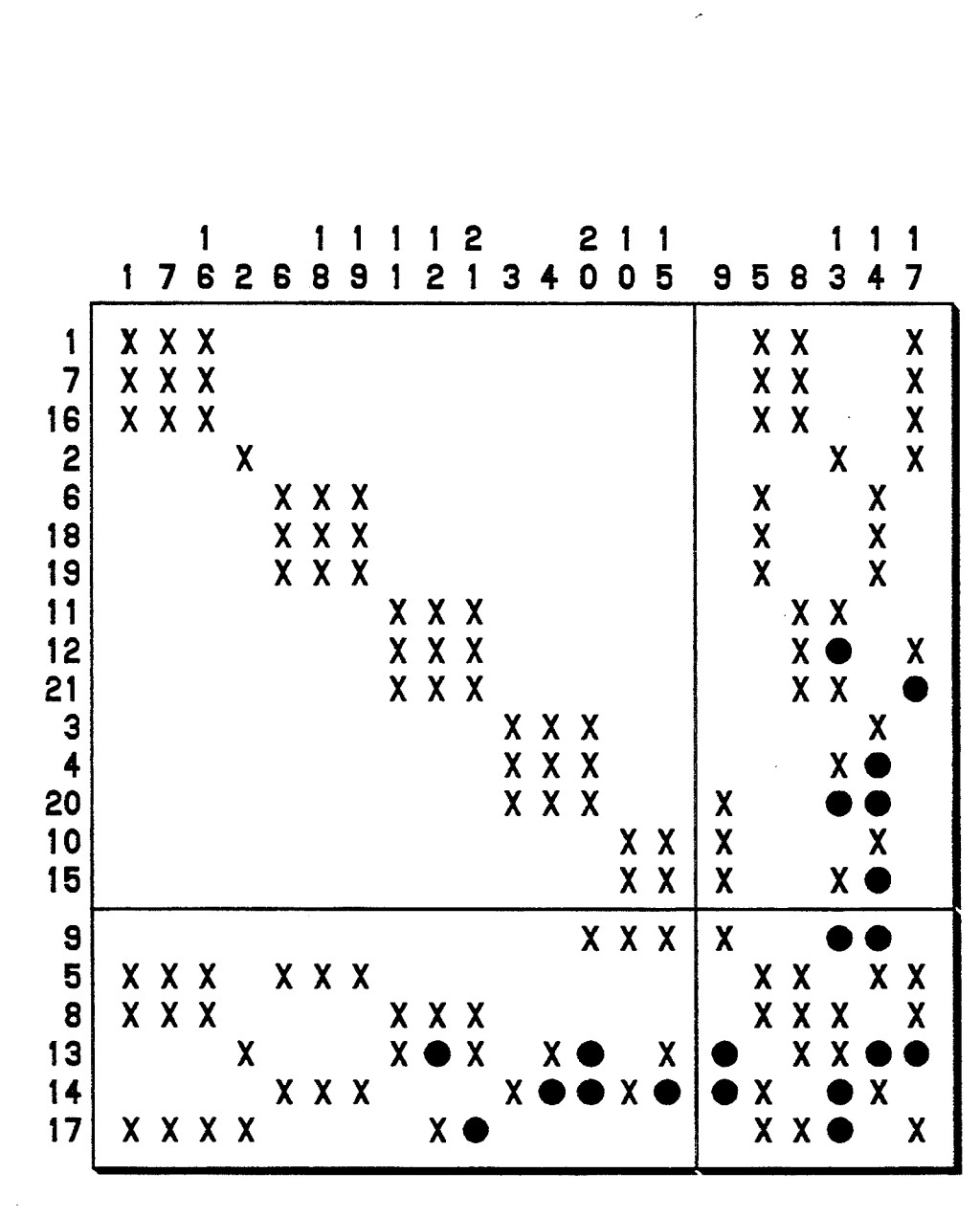

With this information in hand, the 7 by 7 block bordered diagonal matrix PMP TM given in FIG. 32 provides a number of worthwhile facts. First, if the leading block A in PMP TM were to consist of the two diagonal blocks $A_{11}$ and $A_{33}$, then no fill element will be produced in the factorization of PMP TM into the product form in (2) since both G($U_1$) and G($U_4$) are interior cliques (property (a)). Second, If pivot block A were to consist of diagonal blocks $A_{11}$ through $A_{33}$, then all fill elements will occur in the Schur complement $D-X^TX$ and none in the block X since each of the three cliques G ($U_1$), G($U_2$) and G($U_4$) is semi-interior (property (b)). Also, since both cliques G($U_1$) and G($U_4$) are interior and G($U_2$) is strictly semi-interior, each fill element in $D-X^TX$ will correspond to an edge which is not in the subgraph induced by the neighborhood $N_GU_2$. Therefore, the fill elements in the Schur complement $D-X^TX$ will be in the two locations (13, 17) and (17, 13) of the original matrix M since $N_GU_2=\{v_{13}, v_{17}\}$ and the pair $(v_{13}, v_{17})$ is not an edge of G. Third, if the pivot block A were to consist of diagonal blocks $A_{11}$ through $A_{44}$, then the fill elements will occur in the locations shown in FIG. 34. Fourth, if the pivot block A were to consist of diagonal blocks $A_{11}$ through $A_{66}$, then the fill elements will occur in the locations shown in FIG. 35.

The invention roadmap shown in FIG. 4 consists of four major blocks. These are block 410 (sparsedata), block 420 (search), block 430 (dfs) and block 440 (cliques). A detailed description of the steps executed in each of these four blocks follows.

Figure 5:
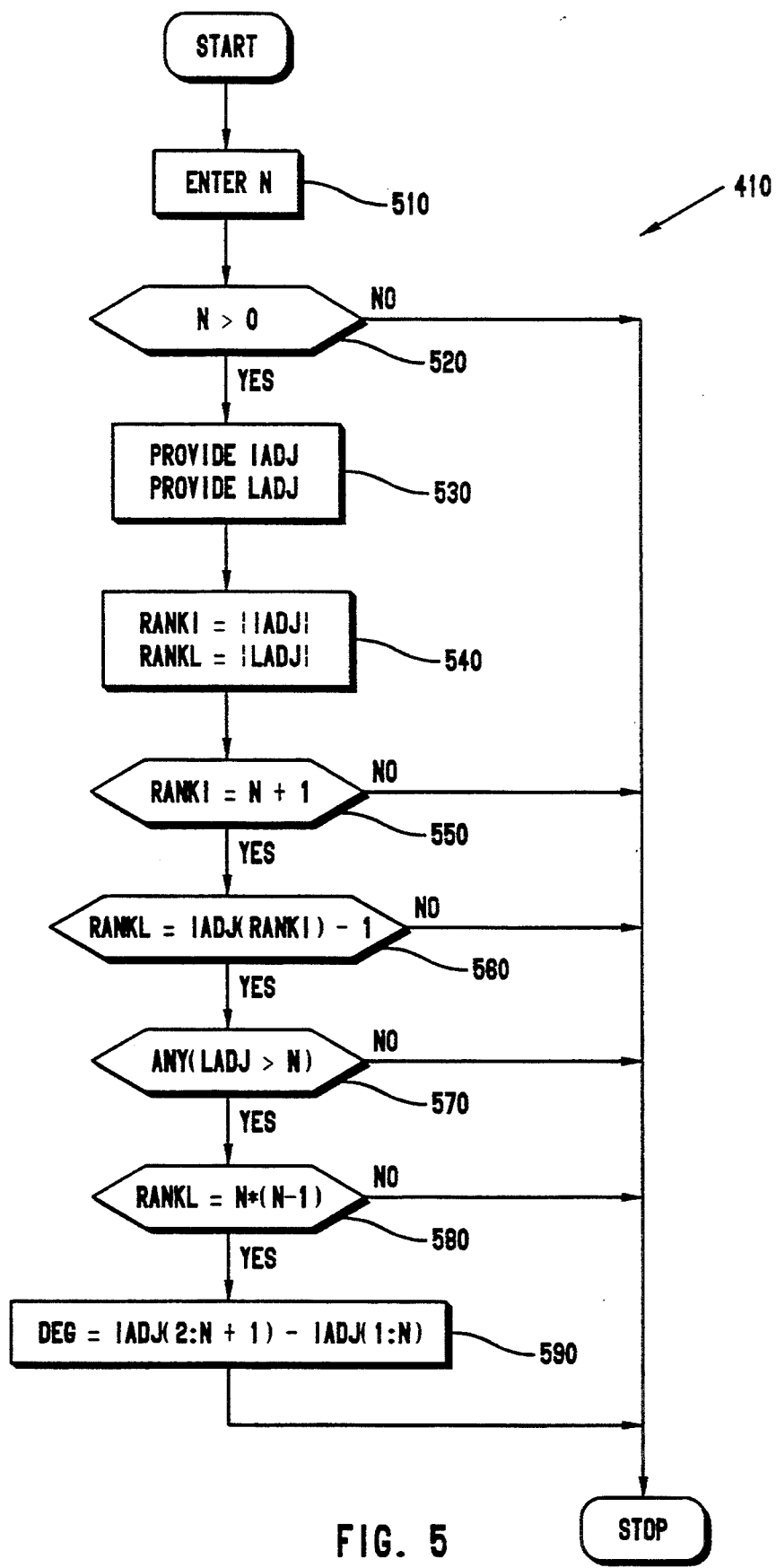
FIG. 5 is a flowchart which depicts module sparsedata in functional terms.

Description of Block 410 (sparsedata). Block 410 shown in FIG. 5 provides the dimension n of matrix M, the adjacency structure pair (IADJ, LADJ) of matrix M and computes the single array DEG. The software implementation of block 410 is given in FIG. 16. Block 510 queries the user for the dimension n of matrix M through an "input" function included in the software implementation in FIG. 15. If the integer n provided by the user is less than or equal to one, the condition in block 520 is violated and as a result the program quits. Otherwise block 410 proceeds to block 530 where the two single arrays IADJ and LADJ are provided by the user. The software implementation in FIG. 5 is designed so that more than one application can be entered in sparsedata.

Block 410 also monitors the correctness of input data by checking the validity of the equalities $|\text{IADJ}|=n+1$ (condition in block 550) and $|\text{LADJ}|=\text{IADJ}(|\text{IADJ}|)-1$ (condition in block 560) and the inequality $\text{LADJ}(i) \leq n$ for all $i \leq |\text{LADJ}|$ (condition in block 570). If any of these three conditions is violated, the program quits and prints a brief message to assist the user. (The messages are included in the software implementation given in FIG. 15.) The program roadmap also quits if the equality $|\text{LADJ}|=n\times(n-1)$ (condition in block 580) holds since the off-diagonal part of matrix M will be completely full with nonzero elements, and thus M will have no sparsity to exploit. If the condition in block 580 is not satisfied (that is G is not a clique), the program proceeds to block 590 where the single array DEG (degrees of the n vertices) is computed. Subsequently, the execution of sparsedata is completed, and so the program returns to invoking procedure roadmap to execute block 420.

Description of Block 420 (search). Block 420 shown in FIG. 6 will now be described. Let S be a set of vertices initially set to empty. For each edge (v, w) in E, the degrees at vertices v and w can be compared. If the degrees are equal, another edge in E is selected. Suppose the degrees are unequal. Then vertex w is added to S if the degree of w is greater, and vertex v is added to S if the degree of v is greater. The computation of the set S is the key objective of block 420. The software implementation of block 420 is given in FIG. 16.

There are two loops in block 420: An outer loop connecting the output of block 685 to the input of block 610 and an inner loop connecting the output of block 680 to the input of block 620. The integer v (selected in block 610) defines the vertex block 420 visits at each pass of the outer loop. The array ADJ (defined in block 610) consists of the vertices adjacent to vertex v. The integer w (selected in block 620) defines the vertex block 420 visits at each pass of the inner loop. At the ith pass of the inner loop, we have w=ADJ(i) and so each pass of the inner loop in block 420 is equivalent to exploring an edge (v, w) incident with the vertex v picked in the outer loop. For any edge (v, w) incident with v, one of the following two cases must hold. Case 1. VC(w)=0 (condition in block 630 is satisfied). Then vertex w has not been visited in the outer loop which means that the edge (v, w) has not been explored previously. Subsequently, block 420 proceeds to block 640 to compare the degrees at vertices v and w. If the degrees of v and w are equal (condition in block 640 is not satisfied), then block 420 terminates the ith pass of the inner loop by proceeding to block 680. Suppose the degrees of v and w are unequal. If DEG(v)<DEG(w), then w belongs to the set S and so SN(w) is set to 1 in block 660. If DEG(v)>DEG(w), then v belongs to the set S and so SN(v) is set to 1 in block 670. Case 2. VC(w)=1 (condition in block 630 is not satisfied). Then by the second statement in block 610, vertex w has been visited previously in the outer loop which means that the edge (v, w) has already been explored in block 420. Subsequently, block 420 terminates the ith pass of the inner loop by proceeding to block 680.

Block 680 controls the termination of the inner loop. If the condition in block 680 is not satisfied, then all edges incident with v have been explored and as a result the inner loop is terminated. Otherwise block 420 returns to block 620 to start the next iteration of the inner loop. Block 685 controls the termination of the outer loop. If the condition in block 685 is satisfied, then block 420 returns to block 610 to select another vertex which has not been visited previously. Suppose the condition in block 685 is not satisfied. Then block 420 terminates the outer loop and proceeds to block 690 where the array VC is reset to zero (all vertices are marked "new").

By the condition $v<n-1$ in block 685, note that block 420 excludes vertex n from the outer loop since at the completion of the (n−1)th pass of the outer loop we have VC(1)=VC(2)=...=VC(n−1)=1 which means that for any edge (n, w) incident with vertex n the condition in block 630 will not be satisfied. Therefore the outer loop in block 420 for the case where v=n is not required in the computation of the set of vertices S.

FIGS. 36 and 37 illustrate block 420 using the example in FIG. 1. The arrays DEG, VC and SN at the completion of blocks 410 and 415 are shown in FIG. 36. The output at the completion of the kth pass of the outer loop in block 420 is given in column heading k (k=1 through 20). The array SN in column heading 20 provides the set S used earlier.

Description of Block 430 (dfs). Block 430 shown in FIG. 7 computes the connected components of the induced subgraph G(V-S) using the depth-first search method [1], [5]. The connected components of the induced subgraph G(V-S) are placed consecutively on the single array QUEUE. The pointers to the starting vertices of the connected components are placed on the single array IQUEUE. The arrays QUEUE and IQUEUE are initialized to empty in block 415 in FIG. 4. The software implementation of block 430 is given in FIG. 17.

Block 430 contains one loop connecting the output of block 780 to the input of block 720. This loop visits all vertices in V. The integer v (selected in block 720) defines the vertex that block 430 visits at each pass of the loop. If the condition in block 725 is not satisfied, then SN(v)=1 which means that v is in S or equivalently that v is not in any connected component of G(V-S). As a result, block 430 proceeds to block 780 for the next pass of the loop. Suppose the condition in block 730 is not satisfied. Then we have VC(v)=1. But by block 690 in FIG. 6, the array VC contains all '0's at the exit of block 420 (also input of block 430). Thus by the first statement in block 740 it follows that vertex v was visited previously in dis and so block 430 proceeds to block 780 for the next pass of the loop. Suppose vertex v has SN(v)=0 (v is in V-S) and VC(v)=0 (v has not been visited previously). Then block 430 proceeds to block 740. The first statement in block 740 sets VC(v)=1. This marks v as a visited vertex in block 430. The second statement in block 740 adds vertex v to the array QUEUE. The vertices placed on QUEUE in block 740 are the starting vertices of the connected components placed on QUEUE. The third and fourth statements in block 740 compute the integers LEAF and ROOT. The integer LEAF is a pointer to the last vertex placed on array QUEUE while the integer ROOT is a pointer to the starting vertex of the connected component currently computed by block 430. Initially the integer LEAF is set to zero in block 415 in FIG. 4. The fifth statement in block 740 adds the integer ROOT (pointer to starting vertex v) to the array IQUEUE. The last two statements in block 740 initialize the integer RANKE to zero and the single array NGU to empty. RANKE is used to keep count of the edges in a connected component and the array NGU to store the neighborhood of a connected component. Both RANKE and NGU are computed in block 750 and utilized in block 770.

Description of Block 750 (component). At the completion of block 740, block 750 (component(v)) is called to compute a connected component of G(V-S) with starting vertex v. The software implementation of block 750 is given in FIG. 18. The function component(v) in FIG. 18 is recursive, and since recursive programs are not well-suited for flowchart representation the software implementation in FIG. 18 is used for the description of block 750.

By construction, we have ADJ(v)=LADJ(IADJ(v-):IADJ(v+1)−1) and so the main objective of the 'for' loop in FIG. 18 is to visit all vertices adjacent to v. Let w be any vertex adjacent to v. Then one of the following two cases must hold. Case 1. SN(w)=0. Then vertex w is in V-S and so the pair (v, w) is an edge in the connected component of G(V-S) with starting vertex v. Subsequently RANKE is set equal to RANKE+1 in FIG. 18 to account for the edge (v,w) in the connected component. Now one of the following two subcases must hold. Case 1.1. VC(w)=1. Then vertex w was visited previously in block 430 and so component(v) returns to the 'for' loop to pick the next vertex adjacent to v. Case 1.2. VC(w)=0. Then vertex w has not been visited previously. Subsequently component(v) sets VC(w)=0 (to mark w as a visited vertex); adds w to array QUEUE; sets LEAF=LEAF+1 to update the pointer to the last vertex on array QUEUE and then it calls component(w) to repeat the above steps at vertex w. Case 2. SN(w)=1. Then the vertex v is not in the set V-S which means that v is in the neighborhood of the connected component of G(V-S) with starting vertex v. Now one of the following two subcases must hold. Case 2.1. TEST(w)=0. Then component(v) adds vertex w to the array NGU, sets TEST(w)=1 and then it returns to the 'for' loop to pick the next vertex adjacent to v. Case 2.2. TEST(w)=1. By the initialization block 415 in FIG. 4, the array TEST contains all '0's at the input of block 430. So if TEST(w)=1, then w must be on NGU. Therefore if Case 2.2 holds, then component(v) returns to the 'for' loop to pick the next vertex adjacent to v.

By the recursive nature of component(v), the connected subgraph computed by block 430 in G(V-S) is maximal (for a more formal proof see references [1] or [5]), and so the vertices QUEUE(ROOT), QUEUE(ROOT+1) through QUEUE(LEAF) placed on array QUEUE form a connected component of G(V-S) with starting vertex v=QUEUE (ROOT).

Figure 7:
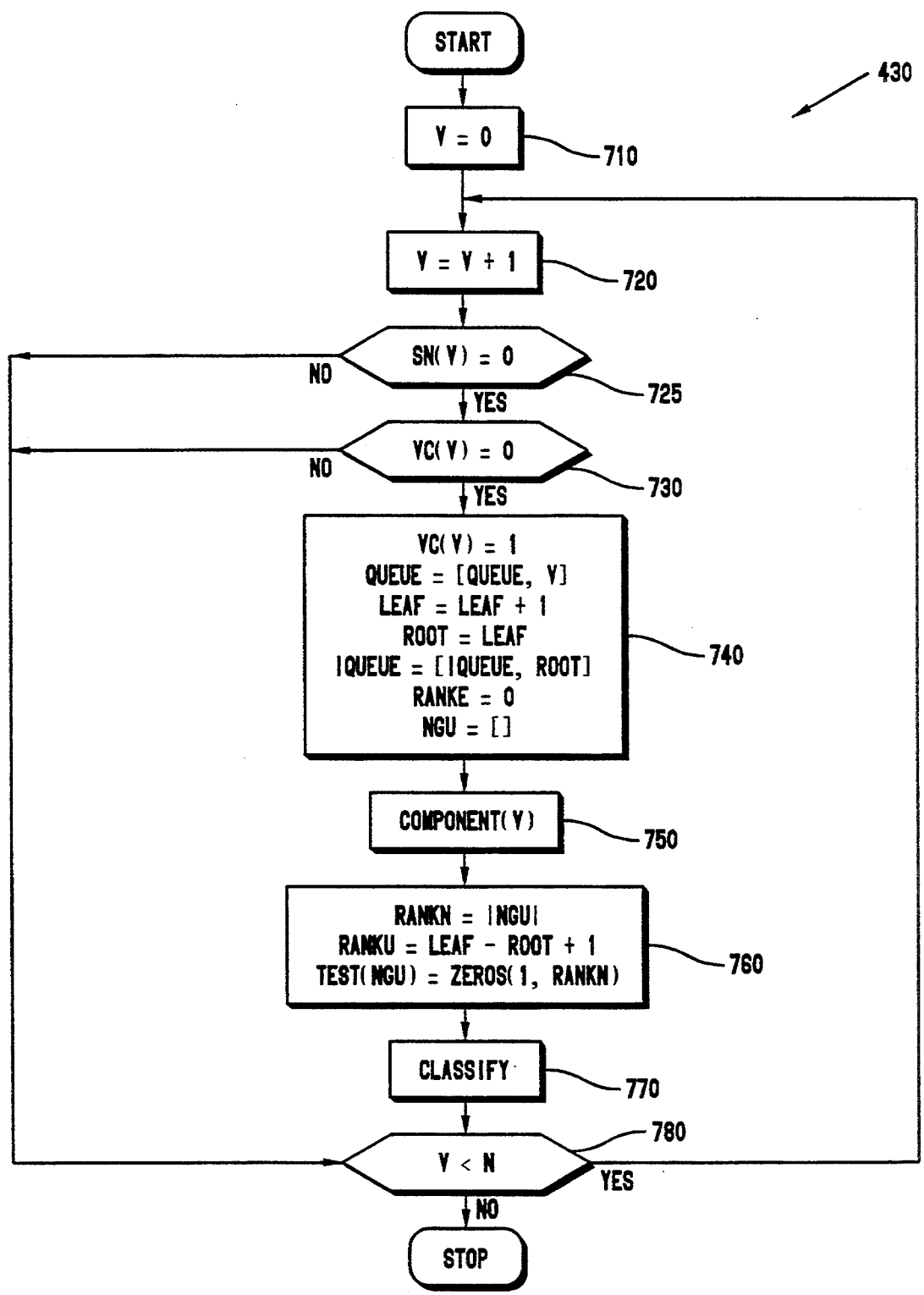
FIG. 7 is a flowchart which depicts the depth-first search algorithm called module dfs, in functional terms.

At the completion of block 750, block 430 proceeds to block 760 in FIG. 7 where RANKN is set to the length of array NGU (size of the neighborhood of the most recently computed connected component); RANKU is set to LEAF-ROOT+1 (size of the most recently computed connected component) and the array TEST is updated so that all the '1's in TEST are reset to 0. At the completion of block 760, block 430 calls block 770 (classify).

Description of Block 770 (classify). Block 770 shown in FIG. 9 performs two distinct tasks. First, a connected component computed by block 430 is categorized either as a clique or a nonclique. Second, if the connected component is a clique, then results derived in [3] are applied to classify the component into a clique of types $C_1$ through $C_4$. The software implementation of block 770 is given in FIG. 19.

Suppose G(U)=(U, E(U)) denotes the most recently computed connected component in block 750 in FIG. 7. Then by block 760 RANKU=|U| and by block 750 RANKE=2|E(U)| since the depth-first search method visits every edge in an undirected graph exactly twice. Now assume that G(U) is a clique. Then |E(U)| =|U|×(|U|−1)/2 since every vertex in a clique is connected to every other vertex. In terms of RANKE and RANKU, |E(U)|=|U|×(|U|−1)/2 thus becomes RANKE=RANKU×(RANKU−1).

This equality forms the condition in block 910 in FIG. 9. Therefore, if the condition in block 910 is satisfied, then G(U) is a clique. Subsequently block 770 proceeds to block 920 to execute its second task. The condition in block 920 is derived from Corollary 4.2 in [3]. This corollary states that a clique is interior if its neighborhood consists of a single vertex. By block 760 in FIG. 7, RANKN denotes the size of the neighborhood of the clique G(U). Thus if the condition in block 920 is satisfied, then G(U) is an interior clique and so block 770 adds 1 to the array TYPE in block 970 and then it proceeds to block 780 in FIG. 7. Suppose the condition in block 920 is not satisfied. Then block 770 proceeds to block 930 to compute the parameter R required in the condition in block 940. The condition in block 940 is derived from Corollary 4.3 in [3]. This corollary states that the clique G(U) is semi-interior (type $C_1$ or type $C_2$) if and only if every vertex in U has degree equal to the parameter R computed in block 930. Therefore if the condition in block 940 is satisfied, then there is a vertex u in U with DEG(u)≠R. This means that the clique G(U) is not semi-interior (G(U) is type $C_3$ or type $C_4$). Consequently, block 770 adds 3 to the array TYPE in block 950 and then it proceeds to block 780 in FIG. 7. If the condition in block 940 is not satisfied, then every vertex in G(U) has degree equal to R and so the clique G(U) is semi-interior. As a result, block 770 adds −2 to the array TYPE in block 960 and then it proceeds to block 780 in FIG. 7.

Suppose the condition in block 910 is not satisfied. Then the connected component G(U) is not a clique. Consequently, block 770 adds the integer 0 to the array TYPE in block 980; sets the part of array VC corresponding to the set of vertices U to zero (marks all vertices in U "new") in block 990 and then calls block 440 (cliques) to compute independent cliques in G(U).

Figure 24:
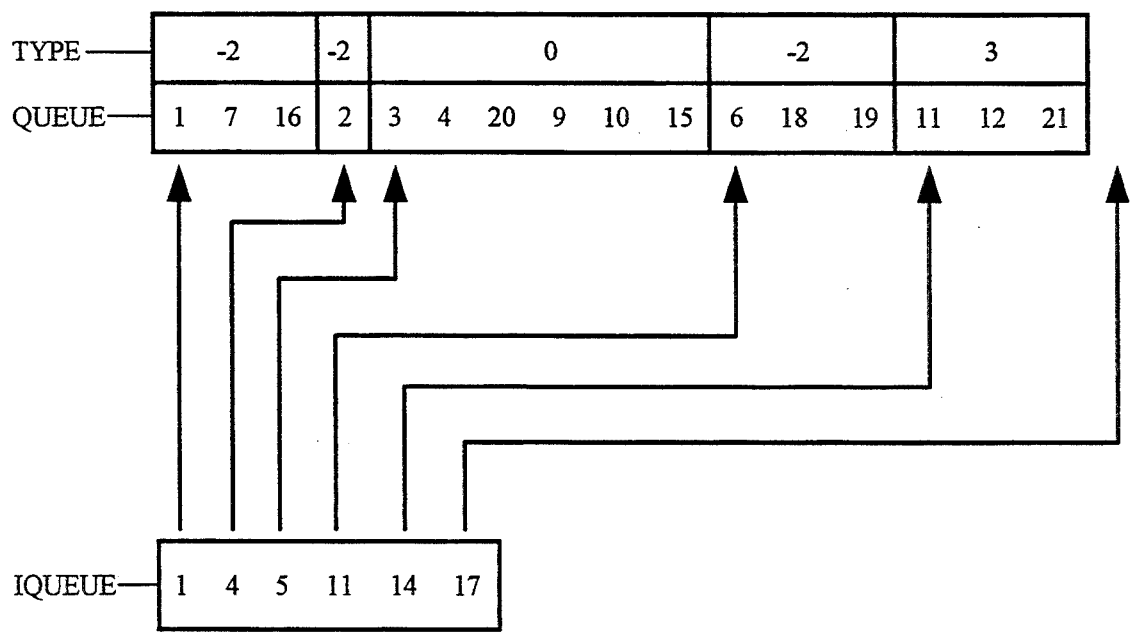
FIG. 24 presents roadmap output (block cliques excluded).
Figure 38:
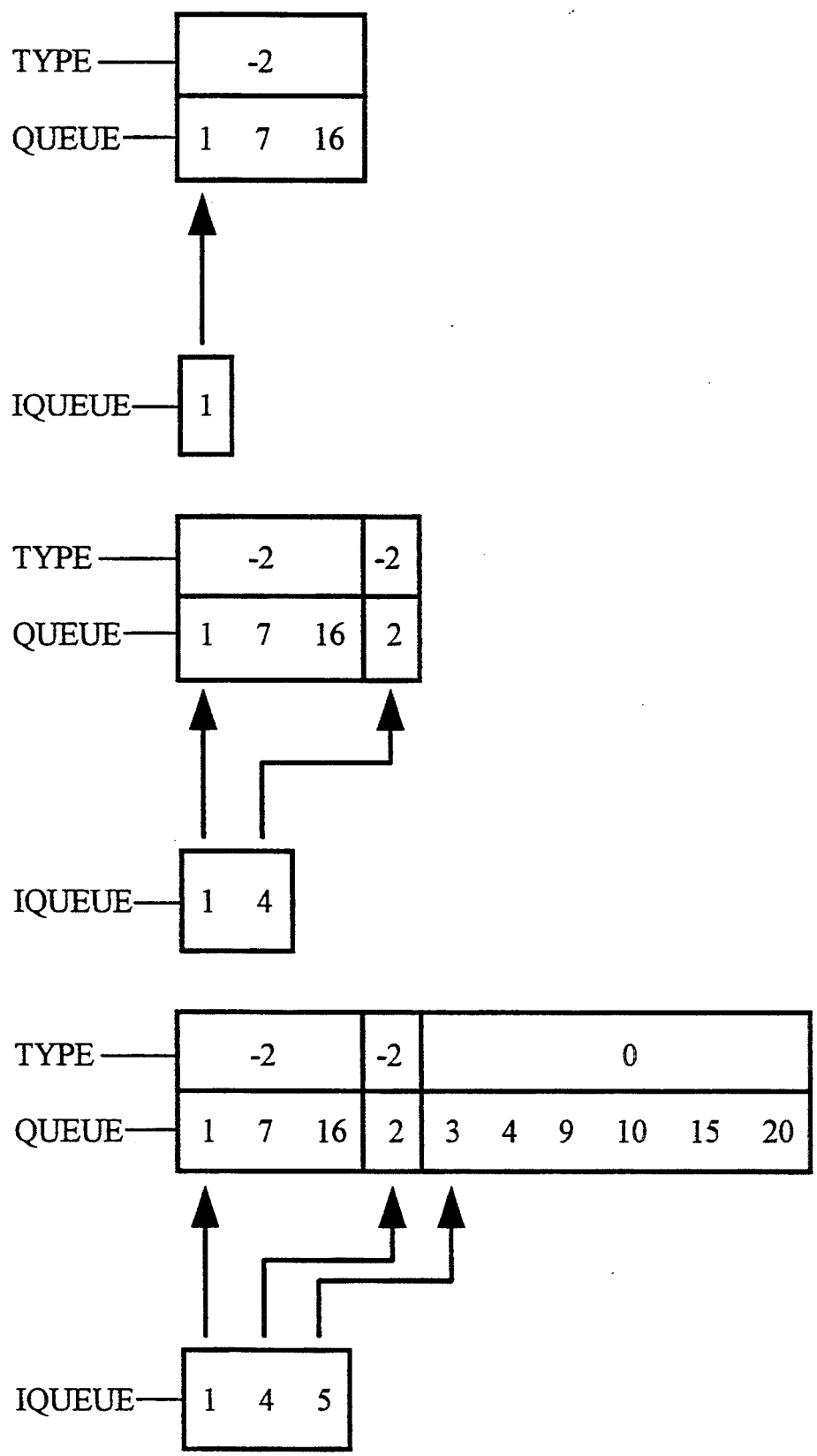
FIG. 38 presents the arrays TYPE, QUEUE and IQUEUE at completion of 1st, 2nd, and 3rd passes of outer loop in block (block 440 (cliques) excluded).

FIGS. 38 and 39 illustrate the application of roadmap to the example in FIG. 1 with block 440 (cliques) excluded from block 770 (classify). The arrays TYPE, QUEUE, and IQUEUE are shown at the completion of each pass of the outer loop of block 430 in FIG. 7. Note that the array IQUEUE does not include the pointer to the end of array QUEUE at the completion of the fifth pass (configuration at the bottom of FIG. 39) since this pointer is added to IQUEUE in block 445 in FIG. 4. The final output of roadmap for this application of roadmap is shown in FIG. 24.

Description of Block 440 (cliques). Given any non-clique connected component G(U) of induced subgraph G(V-S), block 440 shown in FIG. 8 computes a vertex partition $\Pi' = (U_1, U_2, ..., U_t, S')$ such that the following two conditions are satisfied: (1) $G(U_1)$ is a maximal clique in the subgraph of G induced by the set of vertices obtained from U by deleting all vertices in $U_1$ through $U_{i-1}$ and their neighborhoods. (2) Each u in S' is a vertex in the neighborhood of some $U_i$ in the partition. By the first condition, no vertex in any of the t cliques is adjacent to a vertex in any of the other t−1 cliques and so $G(U_1)$ through $G(U_t)$ are independent cliques. The second condition imposed on the vertex partition is to make sure that no part of the connected component G(U) contains a clique which is independent of cliques $G(U_1)$ through $G(U_t)$. The independent cliques computed in block 440 are initially placed one at a time on the single array CLQS (shortening for cliques) while the set of vertices S' is placed on another single array NBRS (shortening for neighborhoods). At the completion of the vertex partition, the part of array QUEUE containing the set of vertices U is replaced by the array [CLQS, NBRS]. The software implementation of block 440 is given in FIG. 20.

Figure 8:
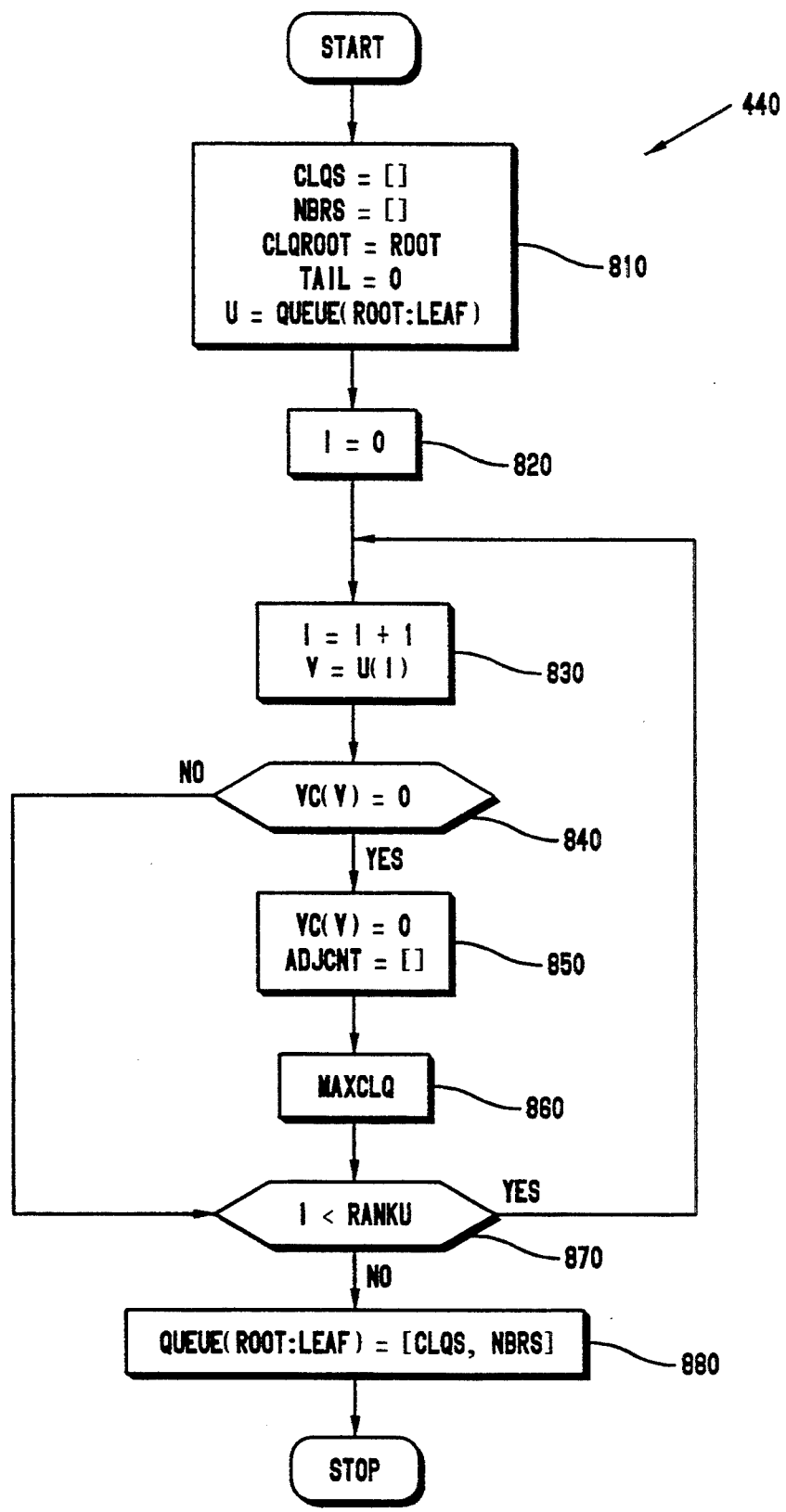
FIG. 8 is a flowchart which depicts the module cliques in functional terms.
Figure 9:
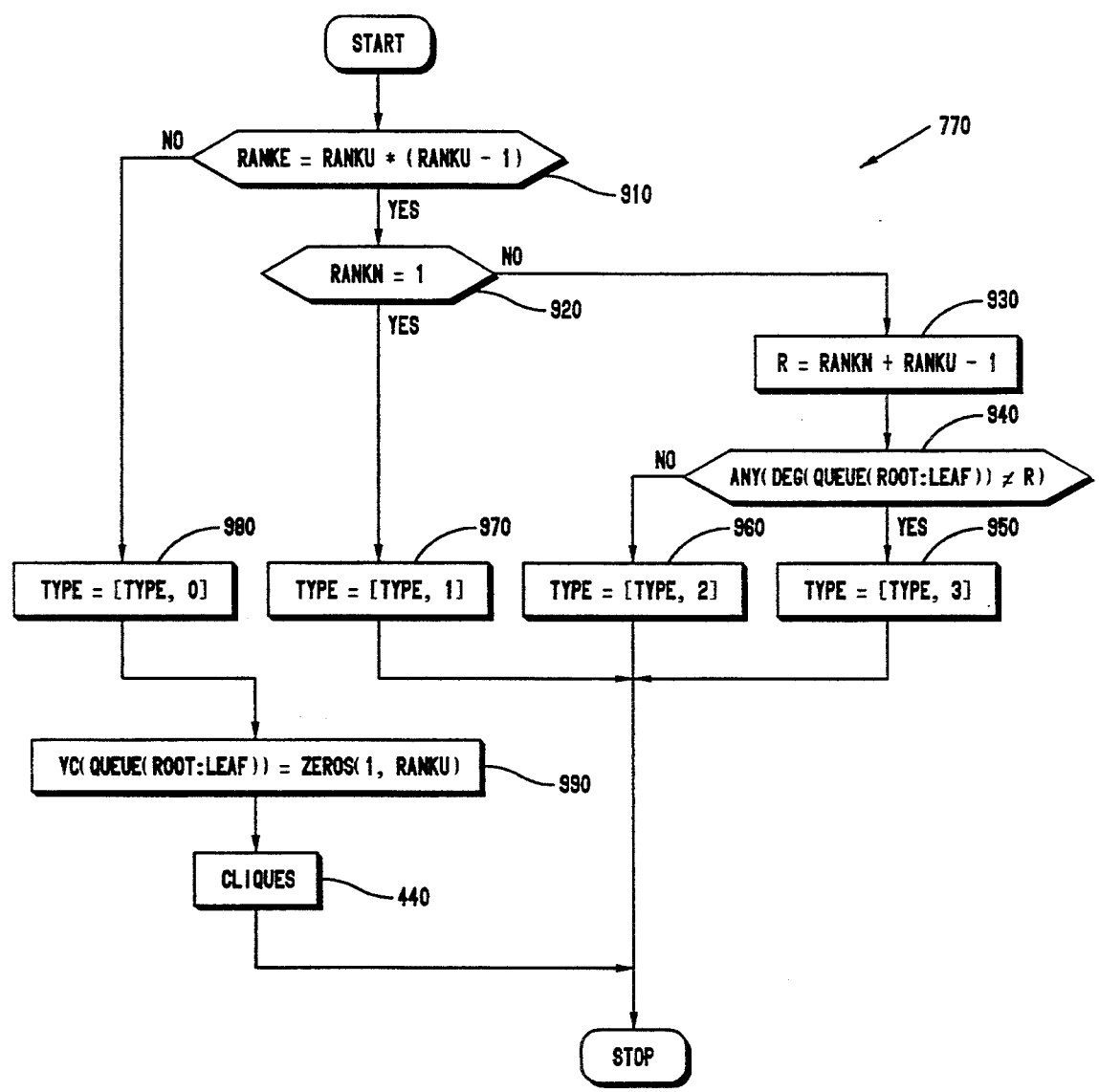
FIG. 9 is a flowchart which depicts the module classify in functional terms.

Block 810 in FIG. 8 initializes the single arrays CLQS and NBRS to empty. The integer CLQROOT defined in in block 810 determines the pointers to the starting vertices of the t independent cliques computed in block 440. Initially, CLQROOT is set to ROOT since the starting vertex of the connected component G(U) is also used as the starting vertex of the first independent clique placed on array QUEUE. The integer TAIL defined in block 810 is used as the pointer to the most recent vertex placed on array CLQS. Since CLQS is initially set to empty, the integer TAIL is set to zero.

Block 440 contains one loop connecting the output of block 870 to the input of block 830. The objective of this loop is to select the starting vertices of the t independent cliques computed in block 440. The integer v (selected in block 830) defines the starting vertex picked at the ith pass of the loop in block 440. Initially, all vertices in U or QUEUE(ROOT:LEAF) are marked "new." The first vertex v selected in block 830 is QUEUE(ROOT) which is the starting vertex of the connected component G(U). In general, suppose v is the the most recently selected vertex in block 830. If the condition in block 840 is not satisfied, then we have VC=1 which means that vertex v was visited previously in block 440 (v is marked "old") and so cliques proceeds to block 870 for the next pass of the loop in block 440. Suppose VC(v)=0 in block 840. Then vertex v is marked "new" and so block 440 proceeds to block 850 where VC(v) is set to 1 (v is marked "old") and the array ADJCNT is initialized to empty. Subsequently block 440 calls block 860 (maxclq).

Figure 11:
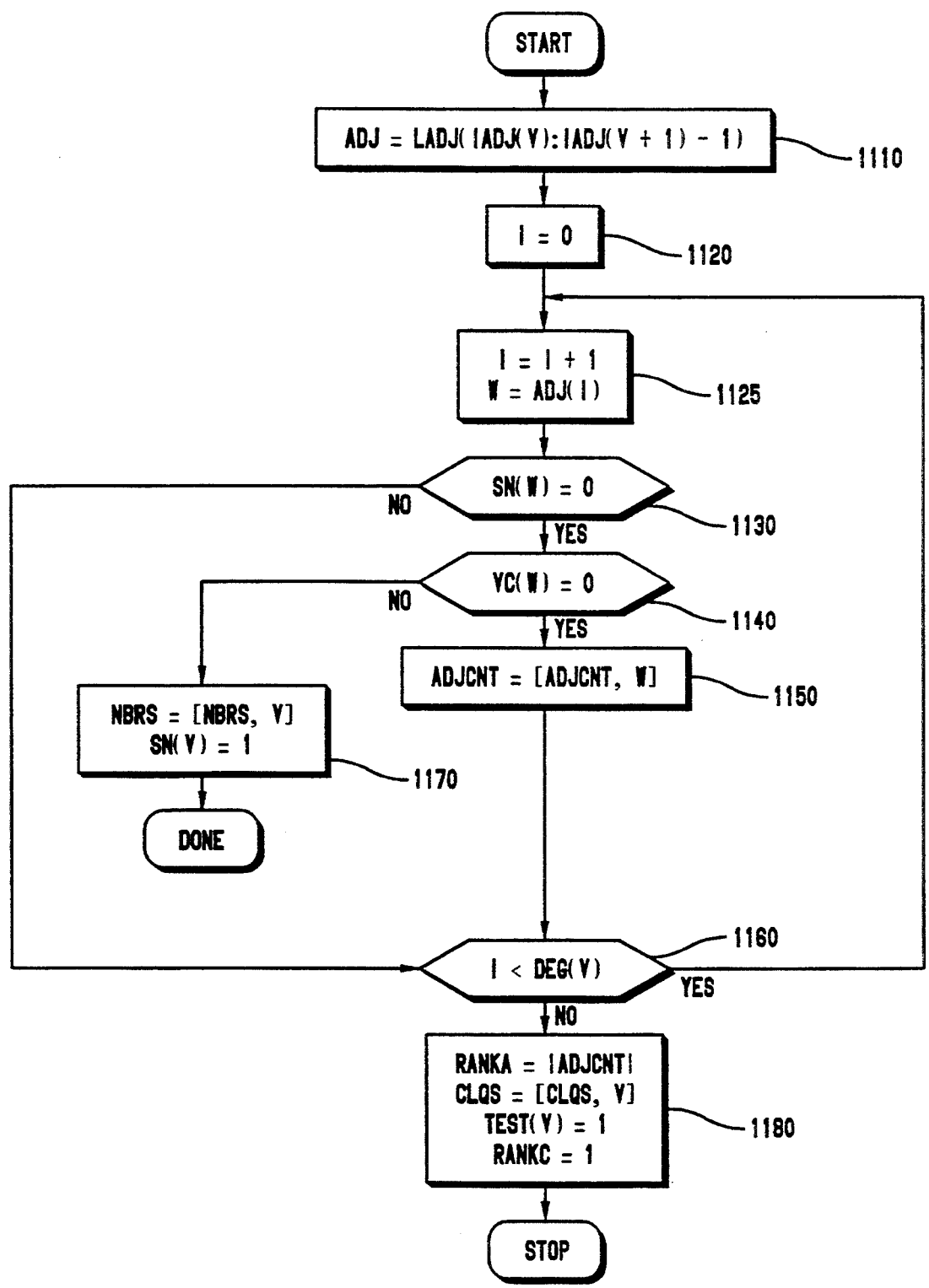
FIG. 11 is a flowchart which depicts the top sub-module of maxclqs in functional terms.
Figure 12:
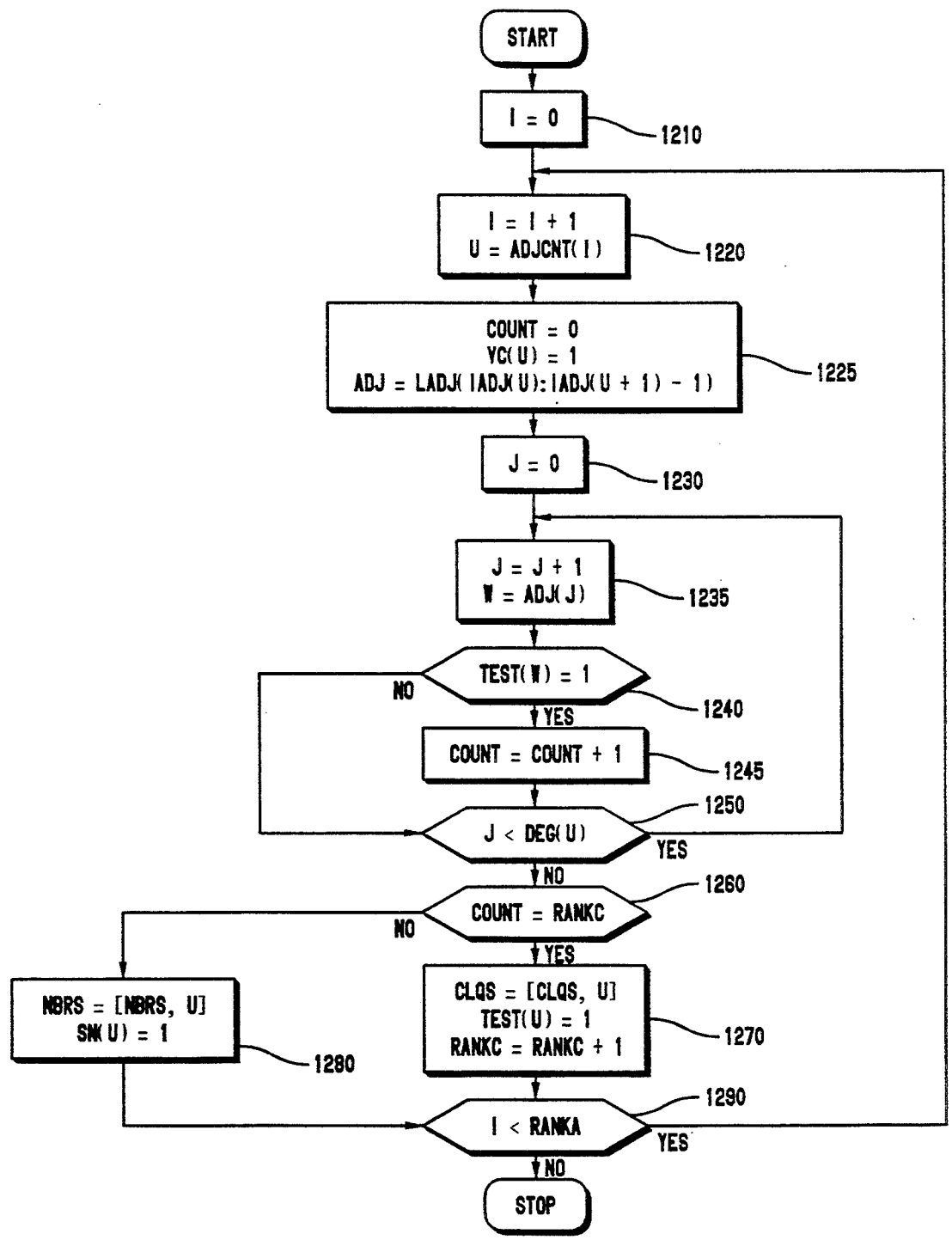
FIG. 12 is a flowchart which depicts the middle sub-module of maxclqs in functional terms.
Figure 13:
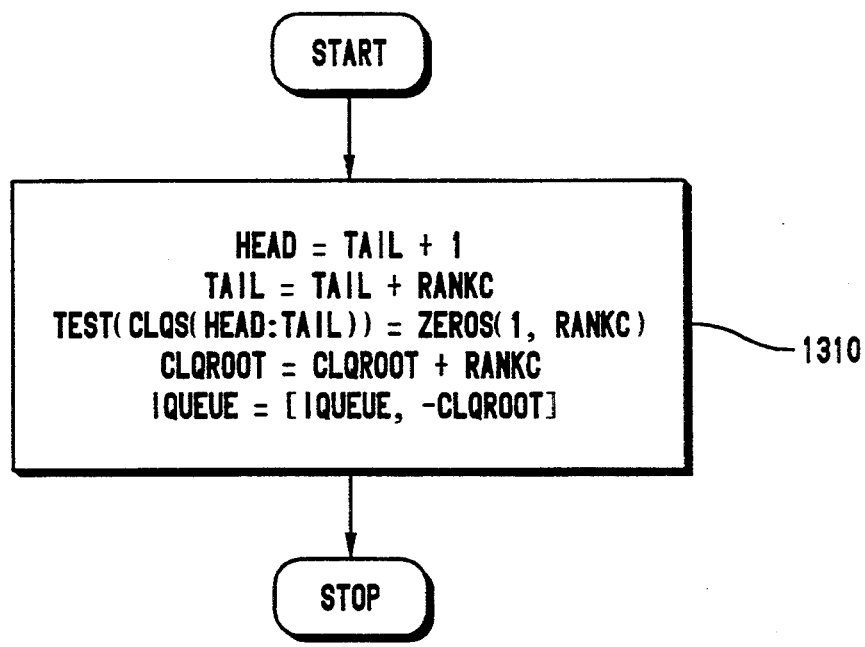
FIG. 13 is a flowchart which depicts the bottom sub-module of maxclqs in functional terms.

Description of Block 860 (maxclq). Block 860 is divided into three parts as shown in FIG. 10. FIGS. 11 through 13 give the flowcharts of these three parts. The main objective of block 860 is to compute an independent clique with starting vertex v. If v is adjacent to some vertex w in a previously computed independent clique (w is on array CLQS), then v is rejected in maxclq as a starting vertex. Subsequently maxclq returns to the calling procedure cliques to select another starting vertex. Otherwise vertex v, which was selected in block 440, becomes the starting vertex of the next independent clique computed in procedure cliques. To distinguish between vertices placed on the two arrays CLQS and NBRS, procedure maxclq uses the Boolean array SN setting SN(u)=1 if and only if a vertex u in U is placed on array NBRS. The software implementation of block 860 is given in FIG. 21.

The acceptance or rejection of vertex v as a starting vertex is accomplished in the block shown in FIG. 11. The array ADJ defined in block 1110 consists of the vertices adjacent to v. The loop in FIG. 11 (connecting the output of block 1160 to the input of block 1125) visits every vertex adjacent to v. The integer w (selected in block 1125) defines the vertex visited at the ith pass of the loop. At each pass of this loop, one of the following two cases must hold. Case 1. SN(w)=1. Then w is either in S or on the array NBRS. If w is in S then w is not in U. If w is on NBRS, then w is not a vertex in a previously computed independent clique and so v is not rejected as a starting vertex. Therefore if the condition in block 1130 is not satisfied (SN(w)=1), maxclq proceeds to block 1160 for the next pass of the loop. Case 2. SN(w)=0. Then w is in the set U. If the condition in block 1140 is satisfied, then w is marked "new" and so maxclq proceeds to block 1150 where vertex w is placed on the array ADJCNT. Next maxclq proceeds to block 1160 for the next pass of the loop. Suppose the condition in block 1140 is not satisfied. Then w is marked "old" which means that vertex w has already been visited in cliques and so w is either on array CLQS or on array NBRS. But since SN(w)=0, vertex w is not on array NBRS and so w has to be on array CLQS. This means that v is adjacent to a vertex in a previously computed independent clique and so v is a vertex in the neighborhood of a previously computed independent clique. Consequently maxclq uses block 1170 to reject v as a starting vertex by placing v on array NBRS, setting SN(v) to 1 and then returning to procedure cliques to select another vertex as a starting vertex. At the completion of the loop in FIG. 11 (or when condition in block 1160 is not satisfied), block 860 proceeds to block 1180.

To distinguish between previously computed independent cliques and the currently computed independent clique, procedure maxclq uses the Boolean array TEST setting TEST(u)=1 if and only if vertex u is in the currently computed independent clique. The size of the most recently computed independent clique is determined using the integer RANKC. Thus when vertex v is added to array CLQS in block 1180, TEST(v) is set to 1 and RANKC is set to 1 since v is the very first vertex of the currently computed independent clique placed on array CLQS.

At the completion of block 1180 in FIG. 11, block 860 proceeds to block 1210 in FIG. 12. There are two loops in FIG. 12, an outer loop connecting the output of block 1290 to the input of block 1220 and an inner loop connecting the output of block 1250 to the input of block 1235. The outer loop visits all vertices placed on array ADJCNT (all vertices adjacent to starting vertex v). The vertex u (selected in block 1220) defines the vertex visited at the ith pass of the outer loop. The first statement in block 1225 initializes COUNT to zero. The second statement sets VC(u)=1 (u is marked "old"), and the third statement defines the array ADJ containing all vertices adjacent to vertex u.

The inner loop in FIG. 12 visits all vertices on ADJ (all vertices adjacent to vertex u). The integer w (selected in block 1235) defines the vertex visited at the jth pass of the inner loop. If the condition in block 1240 is not satisfied, then w is not adjacent to some vertex in the most recently computed independent clique and so block 860 proceeds to block 1250 for the next pass of the inner loop. Suppose the condition in block 1240 is satisfied. Then w is a vertex in the most recently computed independent clique. Subsequently block 860 adds 1 to the integer COUNT in block 1245 and proceeds to block 1250 for the next pass of the inner loop.

At the completion of the inner loop, block 860 tests the validity of the condition in block 1260. If COUNT≠RANKC, then vertex u is not adjacent to every vertex in the most recently computed independent clique and so u is not a vertex in the independent clique with starting vertex v. Consequently, block 860 proceeds to block 1280 where u is added to the array NBRS (u is adjacent to v and so u is a vertex in the neighborhood of the clique with starting vertex v) and SN(u) is set to 1 in the same way SN(v) was set to 1 in block 1180. At the completion of block 1280, block 860 proceeds to block 1290 for the next pass of the outer loop. Suppose COUNT=RANKC in block 1260. Then u is adjacent to every vertex in the currently computed independent clique, and so u is a vertex in the clique with starting vertex v. Consequently, block 860 proceeds to block 1270 where u is added to the array CLQS, TEST(u) is set to 1 to mark u as a vertex in the most recently computed independent clique and RANKC is updated to record the size of the most recently computed independent clique. At the completion of block 1270, block 860 proceeds to block 1290 for the next pass of the outer loop.

At the completion of the block in FIG. 12, block 860 proceeds to block 1310 in FIG. 13. Block 1310 computes the integers HEAD, TAIL and CLQROOT (TAIL was initially set to zero and CLQROOT was set to ROOT in block 810 in FIG. 8). The integer HEAD is the pointer to the starting vertex of the most recent independent clique placed on CLQS and TAIL is the pointer to the last vertex. (By construction, TAIL is also the pointer to the last vertex placed on array CLQS.) In the general case where t>1, CLQROOT is the pointer to the starting vertices of the t independent cliques computed in G(U). For the special case where t=1, CLQROOT is the pointer to the first vertex of the set S' on array QUEUE. The third statement in block 1310 uses the integers HEAD and TAIL to reset all the '1's in array TEST to zero. This update of the array TEST is essential for distinguishing the most recently computed independent clique from previously computed cliques. The fifth and last statement in block 1310 adds the pointer CLQROOT (reversed in sign) to the array IQUEUE. At the completion of block 1310, block 860 proceeds to block 870 in FIG. 8 for the next pass of the loop in block 440.

At the completion of the loop in block 440, the program proceeds to block 880 in FIG. 8 where the part of array QUEUE containing the vertices in U is replaced by the array [CLQS, NBRS]. At the completion of block 880, block 440 returns to block 770 in FIG. 9. This marks the end of block 770 (classify) in FIG. 7 and so roadmap proceeds to block 780 in FIG. 7 for the next pass of the loop in block 430.

At the completion of the loop in block 430, roadmap proceeds to block 445 in FIG. 4 where the pointer to the end of array QUEUE is added to array IQUEUE. This completes the description of all parts of roadmap for the case where the set of vertices S is nonempty.

Suppose the set S is empty at the completion of block 420 in FIG. 4. Then the condition in block 425 in FIG. 4 is not satisfied and so roadmap proceeds to block 435. The first four statements in block 435 initiate the integers ROOT and LEAF and the arrays QUEUE and IQUEUE since these integers and arrays are required in block 440. The program roadmap assumes G is a connected graph. If G is not connected, then the depth-first search method [1], [5] can be used for computing the connected components of G. Subsequently the invention is applied to each connected component of G. So without any loss of generality it may be assumed that G is a connected graph. If G is a clique, then the condition in block 580 in FIG. 410 is satisfied which means that the program would have halted earlier in block 410. Therefore G cannot be a clique and so roadmap adds the integer 0 to the array TYPE in block 435. At the completion of block 435, roadmap calls block 440 (cliques) to compute the independent cliques in G.

Figure 40:
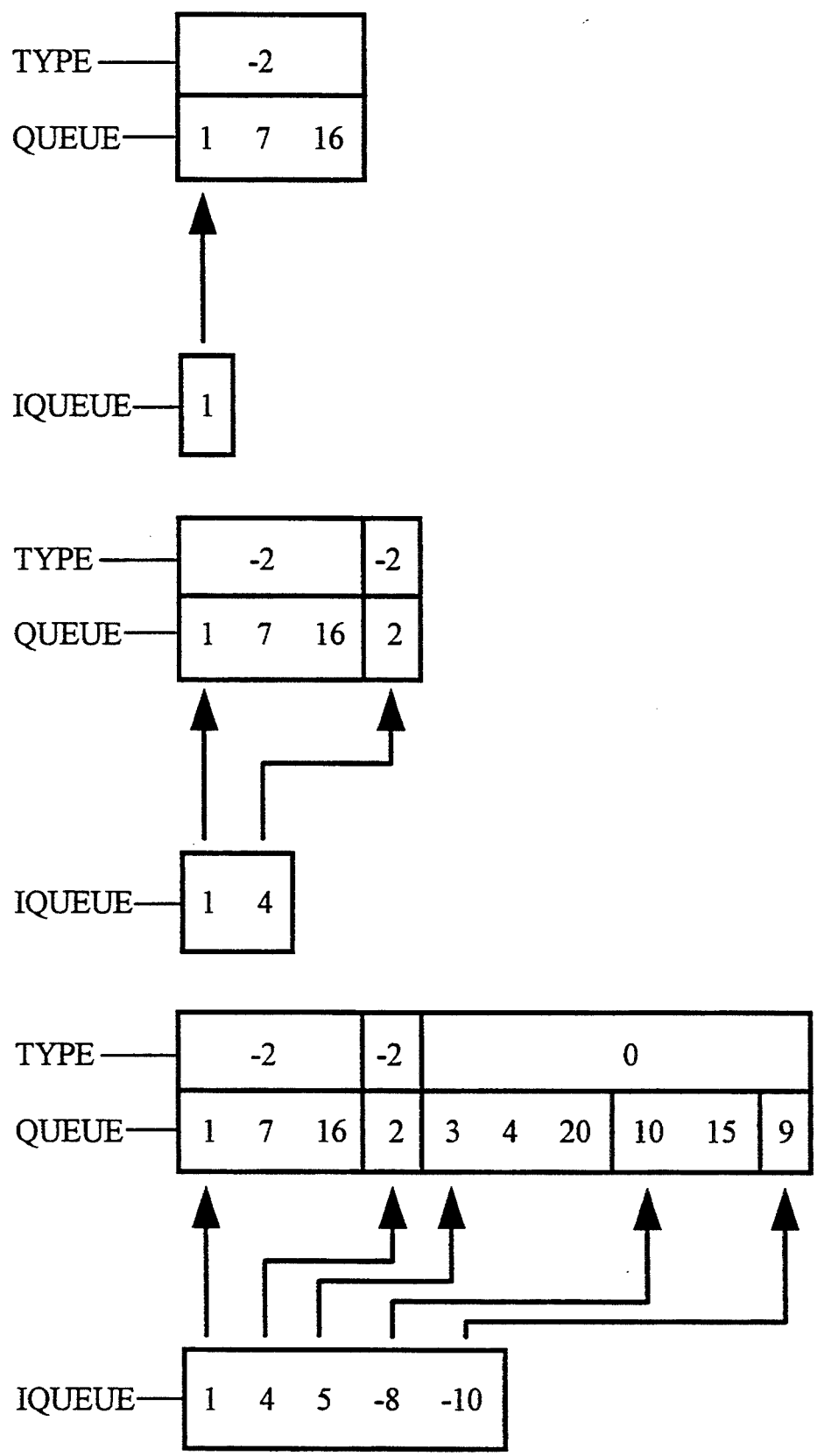
FIG. 40 presents the arrays TYPE, QUEUE and IQUEUE at completion of 1st, 2nd, and 3rd passes of outer loop in block 430.

FIGS. 40 and 41 illustrate the application of roadmap to the example in FIG. 1. The arrays TYPE, QUEUE, and IQUEUE are shown at the completion of each pass of the outer loop of block 430 in FIG. 7. As in the previous illustration, the array IQUEUE does not include the pointer to the end of array QUEUE at the completion of the fifth pass (configuration at bottom of FIG. 41) since this pointer is added to IQUEUE in block 445 in FIG. 4. The final output for this application of roadmap is shown in FIG. 28.

Hardware Embodying the Invention

Implementation of the invention in hardware is obtained by implementing each of the individual blocks in FIG. 4 in one or more hardware modules. These modules may be physically different and separate entities, or may be combined together to reside in one physical machine. FIG. 22 depicts a system which employs a single module for each of the blocks 420, 425, 435 and 440 and four modules for block 430.

Figure 6:
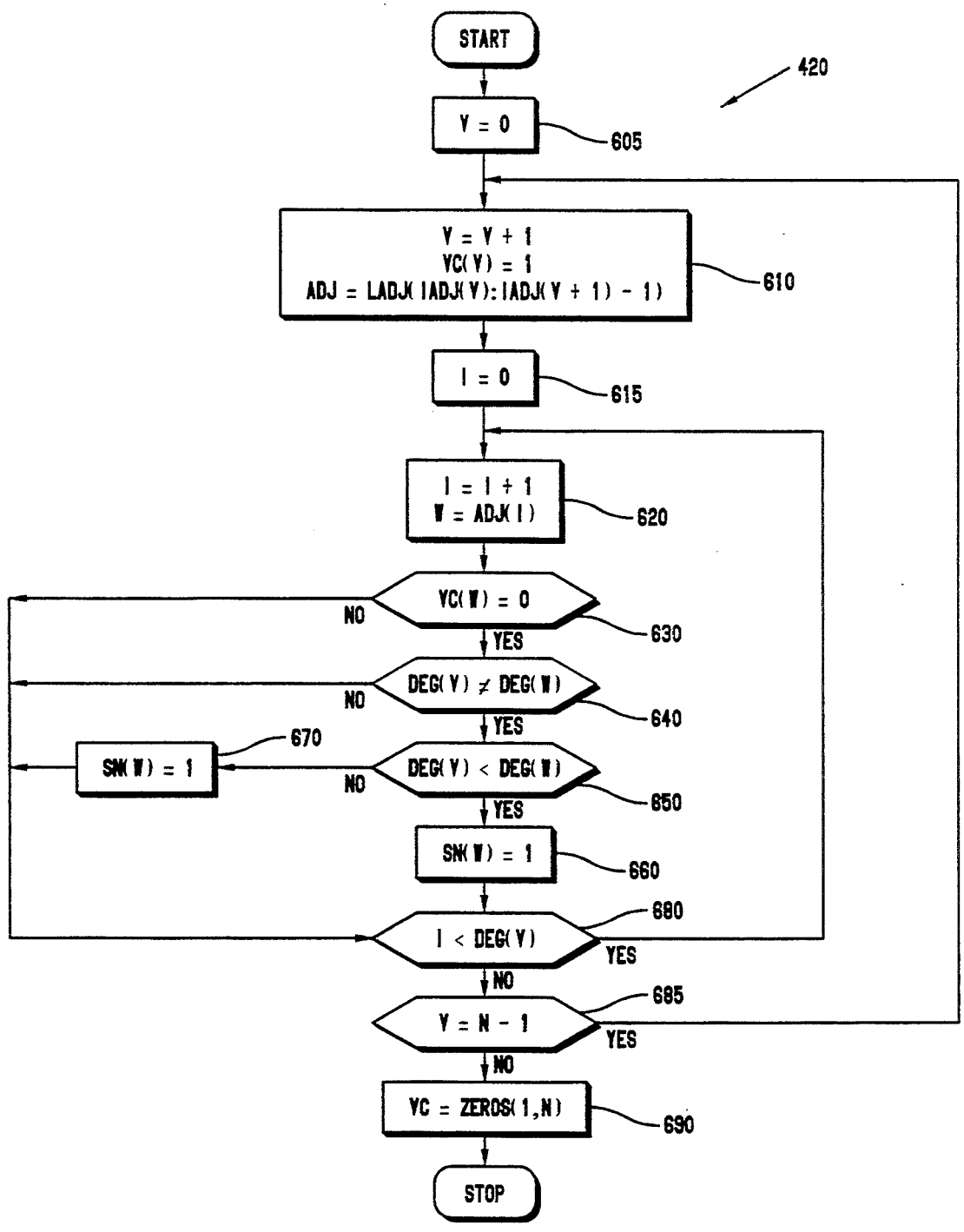
FIG. 6 is a flowchart which depicts module search in functional terms.

Module 2220 in FIG. 22 performs the search function incorporated in block 420 in FIG. 6. Module 2225 performs the test function incorporated in block 425 in FIG. 4. Module 2250 performs the cliques function incorporated in block 440 in FIG. 8 while the combined modules 2240 and 2250 perform the classify function incorporated in block 770 in FIG. 9. Similarly, the combined modules 2230, 2240, 2250 and 2260 perform the dfs function incorporated in block 430 in FIG. 7. The integers 1 and 2 attached to the two inputs and two outputs of module 2250 are intended to distinguish the the two distinct calls made to module 2250 one within block 770 in FIG. 9 and the other within the program roadmap in FIG. 4. The table in FIG. 42 highlights the functional and modular connections utilized in the hardware implementation given in FIG. 22.

Module 2280 in FIG. 22 is the front-end computer used in conjunction with the high-performance parallel-architecture machine 2290. The input data required in blocks 410, 415 and 445 reside in the front-end computer 2280. The front-end computer also performs the input data monitoring function incorporated in block 410 in FIG. 5.

Each of the modules 2220, 2225, 2230, 2240, 2250, 2260, 2270, 2280 and 2290 may be implemented by general purpose digital computers, special purpose integrated circuits or any combination thereof capable of performing the described functions.

The processors in the parallel machine 2290 are assumed to have arbitrary connectivity topology. In the general case, the connectivity topology in a parallel architecture machine may take a variety of forms. This includes the tree, the ring, the mesh, and the torus topologies. The hardware implementation given in FIG. 22 may incorporate any of these or future connectivity topologies since the computation of the parallel regions produced by the invention requires minimal interprocessor communication.

Figure 43:
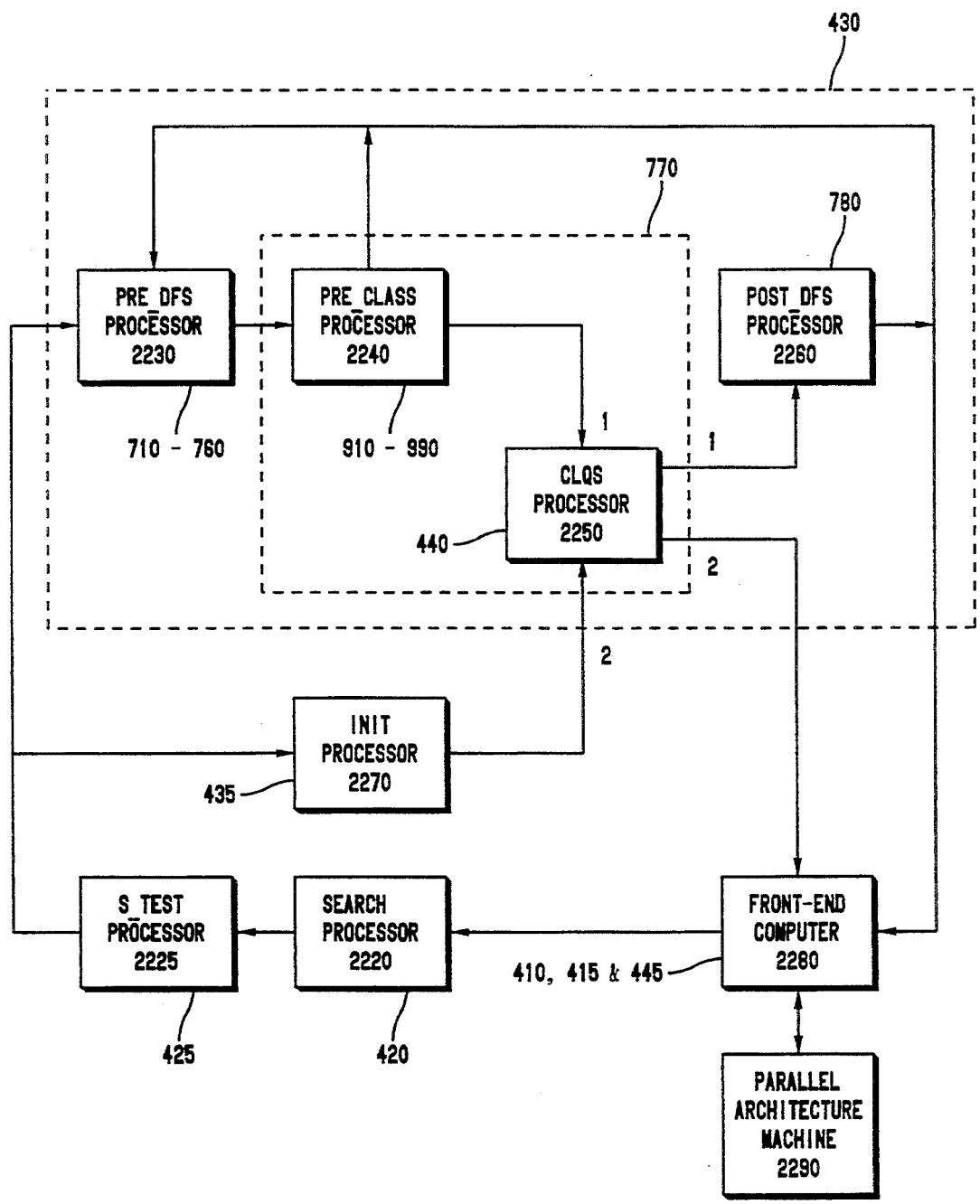
FIG. 43 presents a block diagram of the hardware implementation using the corresponding labels in the software implementation.

The overall configuration of the hardware implementation in FIG. 22 is in complete agreement with the structure of the program roadmap given in FIG. 4. FIG. 43 gives the hardware implementation in FIG. 22 using the labels adopted in the software implementation roadmap whereas the table in FIG. 44 combines the information included in FIGS. 42 and 43 to give a precise correspondence between every connection used in both the software and hardware implementations of the invention.

References

[1] A.V. Aho, J.E. Hopcroft and J.D. Ullman, The Design and Analysis of Computer Algorithms, Reading, MA, Addison-Wesley, 3rd Printing, 1976.

[2] A. George and J. W-H Liu, Computer Solution of Large Sparse Positive Definite Systems, Prentice-Hall, Inc., Englewood Cliffs, N.J., 1981.

[3] A.K. Kevorkian, "Decomposition of large sparse symmetric systems for parallel computation", NRaD Technical Report (appended hereto as Appendix 1 and incorporated herein). Part of this work was presented and published in Proceedings of the First DARPA Annual PI Meeting on High Performance Software, Jan. 15–17, 1992.

[4] The Math Works, Pro-MATLAB User's Guide, South Natick, MA, 1990.

[5] R.E. Tarjan, "Depth-first search and linear graph algorithms" SIAM J. Comput, 1 (1972), pp 146–160.

[6] W.F. Tinney and J.W. Walker, "Direct solutions of sparse network equations by optimally ordered triangular factorizations" IEEE Proc., 55 (1967), pp 1801–1809.

Summary, Ramifications and Scope

The advantages of the present invention are numerous. The present invention is a universally applicable pre-processor which can convert any multi-processor parallel-architecture computer to one which can receive any standard linear algebra problem of the sparse symmetric type considered herein and process it in an efficient manner, making use of the problem's hidden parallelisms, in such a manner as to reduce both storage requirements and execution time, with no requirement of special preparation by a human operator taking account of the number of processors available, nor interactive intervention by a human operator, such as to allocate the independent sub-tasks to particular processors, during the processing.

Thus the present invention provides a pre-processor which is a completely automatic parallelization tool applicable to any parallel architecture computer and any linear problem of the broad and important class considered.

The search function described in block 420 is novel in the sparse matrix field. Algorithmic research and software development over the last three decades have brought about many powerful methods for exploiting sparsity in symmetric matrices. Among these methods, the minimum degree algorithm [2], [6] stands out as the most popular and widely used ordering scheme. While the minimum degree method is a powerful heuristic tool for keeping the number of fill elements small, this method does not furnish any useful information on how to compute parallel regions in an arbitrary sparse symmetric problem. In sharp contrast to the minimum degree method, the method described here produces parallel regions of computation and also keeps the number of fill elements small.

It is worth noting that every graph $G=(V, E)$ consists of two fundamental building blocks which are vertices and edges. The minimum degree method utilizes the information about degrees at each vertex (building block) in V whereas the method in block 420 takes the radically different approach of exploiting the information about degrees at the two end points of each edge (building block) in E simultaneously.

The entire program including all major blocks in FIG. 4 produces parallel regions (in the manner described in this patent application) in computer time proportional to the number of vertices in V (dimension n of matrix M) plus the number of edges in E (number of nonzero elements in either the strictly lower or strictly upper part of M). This linear-time computational complexity of roadmap makes the invention in this patent application ideally suited for very large sparse problems where there is very little knowledge about the underlying structure governing the behavior of the system.

Block 640 in FIG. 6 determines the set of vertices V-S which contains the parallel regions produced by the invention in this patent application. Therefore, the condition in block 640 in block 420 (search) is a critical component of this invention.

Straightforward analysis shows that the condition in block 640 is equivalent to the following condition $$0 < abs(DEG(v) - DEG(w))$$

where $abs(\cdot)$ denotes the absolute value of the enclosed expression, and so the condition in block 640 is a special case of the more general condition $$0 < abs(DEG(v) - DEG(w)) \leq p, \quad (p = 1, 2, \ldots).$$

The utilization of this condition in block 420 provides roadmap the capability to produce a number of parallel regions with varying characteristics simply by setting p to 1, 2 and so forth in the condition.

If roadmap is implemented on different processors of a parallel machine, one may generate a collection of parallel regions by using different values of p on different processors in block 640. This way one may arrive at a scheme that fits best the architecture of the particular parallel machine. There is a penalty however. As we increase the value of p, the number of fill elements produced in the solution process may also increase and thus reduce the overall efficiency of the computation process.

While the present invention has been described relative to a specific embodiment, it is not so limited. The appended listings of computer programs capable of emulating the presently disclosed pre-processor on a general purpose single-processor computer illustrate some of the various obvious alternative embodiments which are possible. Also it has been noted that the condition of strict equality between the degrees of vertices v and w in block 640 of SEARCH module 420 can be relaxed, as shown above, to require merely that the absolute value of the difference be a small non-negative integer (such as 0 or 1 or 2), which permits load-balancing among the various processors.

Thus, although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

Accordingly the scope of the invention should be determined by the appended claims and their legal equivalents rather than by the examples given.

What is claimed as new and desired to be secured by Letters Patent of the United States is:

1. In a network of parallel architecture computers including a front-end computer and a suite of at least two sub-processors, said network for solving a first problem in a class of problems in linear algebra, said class of problems having input data $Mx=b$, where M is a given sparse symmetric matrix having n rows and n colunms, b is a given column vector having n elements, and x is an unknown column vector having n elements, a method of pre-processing said input data to decompose said first problem into a suite of sub-problems for allocation to said sub-processors comprising the following steps:

generating a pre-processing output comprising a permutation $\P$ of positive integers from 1 to n, said permutation defining a new ordering of said n rows and n columns of said sparse symmetric matrix and of said n elements of b and x, respectively, for forming an orthogonal permutation matrix P such that $p^T.p=I$, where $P^T$ denotes P transposed and I denotes an identity matrix having n rows and n columns, and for defining a decomposition $(PMP^T)\cdot(Px)=(Pb)$ of said first problem;

symmetrically permuting said rows and columns of said sparse symmetric matrix and said elements or b and x, respectively, to define said suite of sub-problems in a block-bordered block-diagonal form leading to a Schur-complement resolution;

allocating each of said sub-problems to one of said sub-processors;

computing results from said sub-problems by at least two of said sub-processors operating concurrently; and combining said results in said front-end computer and arranging said results for said Schur-component resolution to solve said first problem for said unknown column vector x.

2. The method of claim 1 wherein said step of generating a pre-processing output includes an arithmetic Boolean function having an input wherein said input comprises an information-theoretic equivalent str(M) of said sparse symmetric matrix, said information theoretic equivalent formed by replacing each non-zero element of said sparse symmetric matrix with '1' to define a sparsity structure of said sparse symmetric matrix, wherein said arithmetic Boolean function outputs said pre-processing output as a permutation $\P = (\pi_1, \pi_2, ..., \pi_n)$ of positive integers (1, 2, ..., n), wherein said arithmetic Boolean function is defined by a graph-theoretic solution of a combinatorial problem formed by associating an undirected graph $G=(V,E)$ of vertices V and edges E with said sparsity structure of said sparse symmetric matrix M, and wherein regions of perfect parallelism in said undirected graph G are identified by computing a set S of vertices wherein interior cliques in said undirected graph G are connected components of an induced subgraph $G(V-S)$.

3. The method of claim 2 wherein said arithmetic Boolean function constructs a vertex partition $II==*(V_1, V_2, ..., V_r, S'')$, where r denotes a number of subsets $V_i$ and $S''$ is a superset of said set S, said vertex partition having the following properties:

(a) each subset $V_i$ of said vertex partition induces a clique in said undirected graph G;

(b) for any two subsets $V_i$ and $V_j$ of said vertex partition, no vertex m $V_i$ is adjacent to a vertex in $V_j$; and (c) each interior clique in said undirected graph G is one of said subsets of said vertex partition.

4. The method of claim 3 wherein said sparse symmetric matrix M is positive definite, and wherein said suite of subproblems problems comprise a parallel factorization of r dense symmetric blocks into a parallel solution of r triangular systems having multiple right-hand sides.

5. The method of claim 2 wherein said arithmetic Boolean function comprises an input-output function $f(\bullet)$, said input-output function defining said permutation $\P$ as a $f(str(M))$ according to the following steps:

(1) receiving said input data and testing said input data for correctness, and continuing at step (2);

(2) initializing integer variables and integer arrays for step (3), and continuing at step (3);

(3) computing said set S in said undirected graph G according to $S=\{v \mid \text{there exists in E an edge } (v,w) \text{ with } DEG(v)>DEG(w)\}$, where DEG is an array of n integers whereto each of said n integers represents a total number of edges incident with each of said vertices of said undirected graph G, and continuing at step (4);

(4) testing whether said set S is empty, mid if empty, continuing at step (6); otherwise continuing at step (5);

(5) executing a sequence of steps (9) and (7);

(6) initializing integer variables and integer arrays for step (7), and continuing at step (7);

(7) recursively computing in each nonclique connected component G(U) of G(V-S) independent cliques $G(U_i)$ and their neighborhoods $N_{G(U)}(U_i)$ such that $G(U_i)$ is a maximal clique in a subgraph $G(U-U_{k=1}^{i=1}\{U_k \cup N_{G(U)}(U_k)\})$ to provide said front-end computer with said pre-processing output, and continuing at step (8);

(8) initializing an integer array to receive outputs sequentially from one of steps (5) and (7), and returning control to said front-end computer;

(9) recursively computing said connected components of said induced subgraph G(V-S).

6. The method of claim 2 wherein said arithmetic Boolean function is in a form of a linear-time algorithm.

7. In a network of parallel architecture computers including a front-end computer and a suite of at least two sub-processors, said network for solving a first problem in a class of problems in linear algebra, said class of problems having input data in a form Mx=b, where M is a given sparse symmetric matrix having n rows and n columns, b is a given column vector having n elements, and x is an unknown column vector having n elements;

a pre-processor for decomposition of said first problem into a suite of sub-problems for allocation to said sub-processors, comprising:

means for generating a pre-processing output comprising a permutation ¶ of positive integers from 1 to n, said permutation defining a new ordering of said rows and columns of said sparse symmetric matrix and of said n elements of b and x, respectively, for forming an orthogonal permutation matrix P wherein $p^T \cdot p = I$, where px denotes P transposed and I denotes an identity matrix having n rows an n columns, and for defining a decomposition $(PMP^T) \cdot (Px) = (Pb)$ of said first problem;

means for symmetrically permuting said n rows and n columns of said sparse symmetric matrix and said elements of b and x, respectively, to define said suite of sub-problems in a block-bordered block-diagonal form leading to a Schur-complement resolution;

means for allocating, including successively selecting, assigning, directing, and distributing, each of said sub-problems to one of said sub-processors;

means for computing results from said sub-problems by at least two of said subprocessors concurrently; and means for combining said results in said front-end computer and arranging said results for said Schur-component resolution to solve said first problem for said unknown column vector x.

8. The pre-processor of claim 7 wherein said pre-processor is operably coupled to said front-end computer, further comprising a hard-wired logic circuit embodying an arithmetic Boolean function.

9. In the field of parallel architecture computers comprising a front-end computer and a suite of at least two sub-processors, said subprocessors for solving a first problem in a class of problems in linear algebra, said class of problems having input data in a form Mx=b, where M is a given sparse symmetric matrix having n rows and n columns, b is a given column vector having n elements, and x is an unknown column vector having n elements;

a pre-processor for decomposing said first problem into a suite of sub-problems and for allocating said subproblems to said sub-processors, said pre-processor comprising a hard-wired logic circuit embodying an arithmetic Boolean function having an input for receiving an information-theoretic equivalent of said sparse symmetric matrix, said information theoretic equivalent comprising a matrix str(M) defining a sparsity structure of said sparse symmetric matrix, wherein said arithmetic Boolean function has an output comprising a permutation ¶ $=(\pi_1 \pi_2, ..., \pi_n)$ of positive integers (1,2, ..., n) and is defined by a graph-theoretic solution of a combinatorial problem formed by associating an undirected graph G=(V,E) of vertices V and edges E with said sparsity structure of said symmetric matrix M, and wherein regions of perfect parallelism in said undirected graph G are identified by a set S of vertices wherein interior cliques in said undirected graph G are connected components of an induced subgraph G(V-S).

10. The pre-processor of claim 9 wherein said arithmetic Boolean function constructs a vertex partition $II'' = (V_1, V_2, ..., V_r, S')$, where r denotes a number of subsets $V_i$ and set S' is a superset of said set S, said vertex partition having the following properties:

(a) each of said subsets $V_i$ of said vertex partition induces a clique in said undirected graph G;

(b) for any two subsets $V_i$ and $V_j$ of said vertex partition, no vertex m $V_i$ is adjacent to a vertex m $V_j$; and (c) each interior clique in said undirected graph G is one of said subsets $V_i$.

11. The pre-processor of claim 9 wherein said sparse symmetric matrix M is positive definite, and wherein said suite of sub-problems comprises a parallel factorization of r dense symmetric blocks and a parallel solution of r triangular systems with multiple right-hand sides.

12. The pre-processor of claim 9 whereto said arithmetic Boolean function comprises an input-output function f(•), said input-output function defining a mapping ¶ =f(str(M)) according to the following steps:

(1) receiving input data and testing said input data for correctness, and continuing at step (2);

(2) initializing integer variables and integer arrays for step (3), and continuing at step (3);

(3) computing said set S in said undirected graph G defined by S={v|there exists in E an edge (v,w) with DEC(v)>DEC(w)}, where DEC is an array of n integers representing a total number of edges incident with one of said vertices in said undirected graph G, and continuing at step (4);

(4) testing whether said set S is empty, and if said set S is empty, continuing at step (6); otherwise continuing at step (5);

(5) executing a sequence of steps (9) and (7);

(6) initializing integer variables and integer arrays for step (7), and continuing at step (7);

(7) recursively computing in each nonclique connected component G(U) of G(V-S) independent cliques $G(U_i)$ and their neighborhoods $N_{G(U)}(U_i)$ such that $G(U_i)$ is a maximal clique in a subgraph $G(U - U_{k=1}^{i-1}\{U_k \cup N_{G(U)}(U_k)\})$ to provide said pre-processing output, and continuing at step (8);

(8) initializing an integer array to receive outputs sequentially from one of steps (5) and (7), and returning control to said front-end computer;

(9) recursively computing said connected components of G(V-S).

13. A pre-processor operably coupled to a from-end computer of a parallel architecture computer comprising a suite of at least two sub-processors, said pre-processor comprising first, second, third, fourth, fifth, sixth, seventh, eighth, and ninth processors for performing arithmetic Boolean graph theoretic combinatorial functions related to an undirected graph G=(V,E) of vertices V and edges E defined by a sparsity structure of an input square symmetric matrix M, wherein regions of perfect parallelism in said undirected graph G are defined for a Schur-component resolution of a linear algebra problem in a form Mx=b, where x is an unknown column vector and b is an input column vector, said regions identified by computing a set S of vertices wherein each interior clique in said undirected graph G is a connected component of an induced subgraph G(V-S);

wherein said front-end computer receives, input data comprising a dimension n of said input square symmetric matrix M and said input column vector b, an adjacency-structure pair defining said sparsity structure of said input square symmetric matrix M, and numerical values of non-zero elements of said input square symmetric matrix M and said input column vector b, respectively, tests for correctness of said input data, computes an array DEG of degrees of vertices of said undirected graph G, initializes integer variables and integer-arrays for said first processor, initializes integer variables for receiving sequential data output from one of said third and fifth processors, and outputs required data to said first processor;

wherein said first which processor receives said required data from said front-end computer and computes in said undirected graph G a set S of vertices defined by S={v|there exists in E an edge (v,w) with DEG(v)>DEG(w)}, and outputs said required data to said second processor;

wherein said second processor tests whether or not said set S is empty, in which case said required data is output to said fourth processor; otherwise said required data is output to said third processor;

wherein said third processor comprises a combination of said sixth, seventh and ninth processors, which combination receives said required data from said second sub-processor and performs a recursive computation of each connected component G(U) of said induced subgraph G(V-S), and upon a self-terminating completion of said recursive computation, said third processor outputs said required data sequentially to said front-end computer;

wherein said fourth processor receives said required data from said second processor if enabled by a flow of said required data, and if so enabled, initializes inputs for said fifth processor and outputs said required data to said fifth processor;

wherein said fifth processor recursively computes in a nonclique connected component G(U) of G(V-S) independent cliques $G(U_i)$ and their neighborhoods $N_{G(U)}(U_i)$ such that $G(U_i)$ is a maximal clique in a subgraph $G(U - U_{k=1}^{i-1}\{U_k \cup N_{G(U)}(U_k)\})$.

wherein said sixth processor comprises a combination of said fifth and eighth processors, wherein said sixth processor receives said required data from said fourth sub-processor if said fourth processor has been enabled by said flow of said required data; otherwise said sixth processor receives said required data from said seventh processor, whereupon said sixth processor categorizes said components into said interior cliques and into noncliques, said noncliques having sparsity preserving characteristics, and classifies said noncliques according to said sparsity preserving characteristics for said Schur-component resolution, and if said seventh processor is enabled, said sixth processor outputs said required data recursively to said ninth processor until a self-terminating completion of said recursive computation, whereupon said sixth processor outputs said required data sequentially to said front-end computer; otherwise said sixth processor immediately outputs said required data sequentially to said front-end computer;

wherein said seventh receives said required data from one of said sixth and eighth processors until completion of said recursive computation by said third processor, whereupon said required data is output to said ninth processor;

wherein said eighth processor receives said required data from said seventh processor and outputs said required data to said seventh processor until completion of said recursive computation by said sixth processor, whereupon said required data is output to said ninth processor; and wherein said ninth processor receives said required data from said sixth processor if said seventh sub-processor is enabled, and after termination of said recursive computation by said third processor, outputs sequentially said required data to said front-end computer.

14. The pre-processor of claim 13 wherein at least one of said processors is implemented by software installed in a computer.

15. The pre-processor of claim 13 wherein at least one of said processors is implemented by a hard-wired logic circuit.

16. The pre-processor of claim 13 wherein said pre-processor is implemented in said front-end computer by a software program.

17. The pre-processor of claim 13 wherein said parallel architecture computer has a linear-time capability for solving sparse symmetric linear algebra problems.

* * * * *